(12) United States Patent
Tian

(10) Patent No.: US 9,041,337 B2
(45) Date of Patent: May 26, 2015

(54) MOTION PROFILE GENERATOR

(75) Inventor: Gang Tian, Westlake, OH (US)

(73) Assignee: LINESTREAM TECHNOLOGIES, Cleveland, OH (US)

( * ) Notice: Subject to any disclaimer, the term of this patent is extended or adjusted under 35 U.S.C. 154(b) by 274 days.

(21) Appl. No.: 13/474,919

(22) Filed: May 18, 2012

(65) Prior Publication Data

US 2013/0307459 A1 Nov. 21, 2013

(51) Int. Cl.
  *G05B 19/25* (2006.01)
  *G05B 13/02* (2006.01)
  *G05B 11/36* (2006.01)
  *G06F 17/12* (2006.01)

(52) U.S. Cl.
  CPC ...................... *G05B 19/25* (2013.01)

(58) Field of Classification Search
  USPC .......... 700/13, 19, 28–37, 44, 45, 52
  See application file for complete search history.

(56) References Cited

U.S. PATENT DOCUMENTS

| | | |
|---|---|---|
| 3,543,010 A | 11/1970 | Dahlin |
| 3,786,242 A | 1/1974 | Brooks |
| 3,826,887 A | 7/1974 | Pemberton |
| 4,481,567 A | 11/1984 | Kaya et al. |
| 4,768,143 A | 8/1988 | Lane et al. |
| 5,229,699 A | 7/1993 | Chu et al. |
| 5,684,375 A | 11/1997 | Chaffee et al. |
| 5,742,503 A | 4/1998 | Yu |
| 6,122,555 A | 9/2000 | Lu |
| 6,128,541 A | 10/2000 | Junk |
| 6,198,246 B1 | 3/2001 | Yutkowitz |

(Continued)

FOREIGN PATENT DOCUMENTS

| | | |
|---|---|---|
| JP | 2002-023807 | 1/2002 |
| JP | 2002023807 A * | 1/2002 |
| WO | 0041043 A1 | 7/2000 |

OTHER PUBLICATIONS

Chang et al. (Chang-Wan Ha; Keun-Ho Rew; Kyung-Soo Kim, "A complete solution to asymmetric S-curve motion profile: Theory & experiments," Control, Automation and Systems, 2008. ICCAS 2008. International Conference on, vol., No., pp. 2845, 2849, Oct. 14-17, 2008) http://ieeexplore.ieee.org/stamp/stamp.jsp?tp=&arnumber=4694244&isnumber=4694179.*

(Continued)

*Primary Examiner* — Bentsu Ro
*Assistant Examiner* — Said Bouziane
(74) *Attorney, Agent, or Firm* — Amin, Turocy & Watson, LLP

(57) ABSTRACT

Systems and methods are provided for generating a constraint-based, time-optimal motion profile for controlling the trajectory of a point-to-point move in a motion control system. A profile generator can calculate an ST-curve motion profile that includes a jerk reference that varies continuously over time for at least one of the motion profile segments, thereby producing a smooth, time-optimal trajectory. The profile generator can create the motion profile to conform to a set of motion constraints provided by the user. The profile generator also supports calculation of time-optimal motion profiles having segments that align to the sample time of the motion control system. In some embodiments, the profile generator can efficiently generate the motion profile by performing reference calculations only for those segments that will be used in the final motion profile for a given point-to-point move.

20 Claims, 13 Drawing Sheets

(56) References Cited

U.S. PATENT DOCUMENTS

| | | | |
|---|---|---|---|
| 6,445,962 | B1 | 9/2002 | Blevins et al. |
| 6,510,353 | B1 | 1/2003 | Gudaz et al. |
| 6,546,295 | B1 | 4/2003 | Pyotsia et al. |
| 6,564,194 | B1 | 5/2003 | Koza et al. |
| 6,631,299 | B1 | 10/2003 | Patel et al. |
| 6,658,305 | B1 | 12/2003 | Gudmundsson et al. |
| 6,980,869 | B1 | 12/2005 | Chandhoke |
| 7,024,253 | B2 | 4/2006 | Gaikwad et al. |
| 7,149,591 | B2 | 12/2006 | Gao et al. |
| 7,346,402 | B1 | 3/2008 | Stahl |
| 7,668,674 | B2 * | 2/2010 | McNutt .................... 702/79 |
| 7,865,254 | B2 | 1/2011 | Gahinet et al. |
| 8,041,436 | B2 | 10/2011 | Gao |
| 8,060,340 | B2 | 11/2011 | Gao et al. |
| 2003/0139825 | A1 | 7/2003 | Lund |
| 2007/0073422 | A1 | 3/2007 | Gaikwad et al. |
| 2007/0075670 | A1 * | 4/2007 | Akiyama .................. 318/651 |
| 2007/0088448 | A1 | 4/2007 | Mylaraswamy et al. |
| 2008/0036413 | A1 * | 2/2008 | Ohta et al. ................ 318/609 |

OTHER PUBLICATIONS

U.S. Office Action for U.S. Appl. No. 10/351,664 mailed on Sep. 8, 2006.

U.S. Office Action for U.S. Appl. No. 10/351,664 mailed on May 1, 2007.

U.S. Office Action for U.S. Appl. No. 10/351,664 mailed on Nov. 14, 2007.

U.S. Office Action for U.S. Appl. No. 10/351,664 mailed on Nov. 21, 2008.

U.S. Office Action for U.S. Appl. No. 10/351,664 mailed on Jul. 31, 2009.

U.S. Office Action for U.S. Appl. No. 10/351,664 mailed on Apr. 12, 2010.

U.S. Office Action for U.S. Appl. No. 10/351,664 mailed on Mar. 3, 2011.

Aaron, "Synthesis of Feedback Control Systems by Means of Pole and Zero Location of the Closed Loop Function". AIEE Transactions, 1951, vol. 70, 8 pages.

Gao, et al., "A Novel Motion Control Design Approach Based on Active Disturbance Rejection". Proceedings of the 40th IEEE Conference on Decision and Control, Orlando, Florida USA, Dec. 2001, 0-7803-7061-9/01 (c)2001 IEEE, 6 pages.

Ghanekar, et al., "Scaling Laws for Frequency Domain Controllers of Dynamically Equivalent Single Flexible Link Manipulators". IEEE International Conference on Robotics and Automation, 0-7803-1965-6/95 (c)1995 IEEE, 6 pages.

Ghanekar, et al., "Scaling Laws for Linear Controllers of Flexible Link Manipulators Characterized by Nondimensional Groups". IEEE Transactions on Robotics and Automation, vol. 13, No. 1, Feb. 1997, 1042-296X/97 (c)1997 IEEE, 11 pages.

Suh, et al., "New PID Identification Algorithm Based on Frequency Scaling", 0-7803-3694-1/97 (c)1997 IEEE, 5 pages.

* cited by examiner

MOTION PROFILE GENERATOR

TECHNICAL FIELD

This disclosure generally relates to motion control, and specifically to generation of constraint-based, time-optimal motion profiles.

BACKGROUND

Many automation applications employ motion control systems to control position and speed motion devices. Such motion control systems typically include one or more motors or similar actuating devices operating under the guidance of a controller, which sends position and/or speed control instructions to the motor in accordance with a user-defined control algorithm or program. In a common architecture, the controller sends the control instructions to a motor drive (e.g., as an analog signal or a series of discrete step signals), and the motor drive controls the driving current output to the motor in accordance with the control instructions, facilitating the controlled movement of the motor.

When the controller determines that the motion system must move to a new position or alter its velocity (e.g., in accordance with the control algorithm or a user request), the controller must calculate a position or velocity trajectory—referred to as a motion profile—for transitioning the motion system from its current position/velocity to the target position/velocity. The motion profile defines the motion system's velocity, acceleration, and/or position over time as the system moves from the current state to the target state. Once this motion profile is calculated, the controller translates the motion profile into appropriate control signaling for moving the motion system through the trajectory defined by the profile.

In some applications, the various segments (or stages) of the motion profile are calculated based on predetermined user-defined constraints (e.g., maximum velocity, maximum acceleration, etc.), where the defined constraints may correspond to mechanical limitations of the motion system. Given these constraints and the desired target position and/or velocity, the controller will calculate the motion profile used to carry out the desired move or velocity change. The resultant motion profile is also a function of the type of profile the controller is configured to generate—typically either a trapezoidal profile or an S-curve profile. For a trapezoidal profile, the controller will calculate the motion profile according to three distinct stages—an acceleration stage, a constant velocity stage, and a deceleration stage. Such a profile results in a trapezoidal velocity curve. The S-curve profile type modifies the trapezoidal profile by adding four additional stages corresponding to these transitions. These additional stages allow gradual transitions between the constant (or zero) velocity stages and the constant acceleration/deceleration stages, providing smoother motion and affording a finer degree of control over the motion profile.

Since the trapezoidal profile always accelerates or decelerates at the maximum defined acceleration rate, this profile type tends to achieve faster point-to-point motion relative to S-curve profiles. However, since the transitions between the constant (or zero) velocity and the acceleration stages are abrupt, the trapezoidal curve may cause excessive system jerk at these transitions. Moreover, there is greater risk of overshooting the target position or velocity when using a trapezoidal motion profile, which can reduce accuracy or cause the controller to expend additional work and settling time bringing the motion device back to the desired target. Alternatively, the S-curve profile can yield greater accuracy due to the more gradual transitions between the constant velocity and acceleration/deceleration phases, but at the cost of additional time spent on the initial point-to-point move.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of this disclosure relate to systems and methods for efficiently generating constraint-based, time-optimal motion profiles. To this end, a profile generator deployed within a controller can leverage a mathematical algorithm to solve for constraint-based, time-optimal point-to-point motion in real-time and to calculate trajectories based on the solution. To achieve smooth and accurate point-to-point motion, the profile generator can calculate the trajectory based on an ST-curve profile type, which generates profiles having a continuous jerk reference over time for at least one acceleration or deceleration segment of the profile. By calculating motion profiles that include a time-varying jerk reference, the profile generator of the present disclosure can yield smoother and more stable motion compared to traditional trapezoidal or S-curve profiles.

The ST-curve profiles generated by the profile generator can support asymmetric acceleration and deceleration phases. Conventionally, asymmetric acceleration and deceleration is supported only by trapezoidal profiles, but not by the smoother S-curve profiles. The ST-curves generated according to the techniques described herein can allow asymmetric acceleration and deceleration to be used with smoother motion profiles. In some embodiments, the profile generator described herein may also generate S-curve profiles that support asymmetric acceleration and deceleration.

In another aspect, one or more embodiments of the profile generator described herein can improve calculation efficiency by omitting calculations for trajectory segments that will not be used in the final trajectory. That is, rather than calculating profile data for all seven profile stages even in cases for which one or more of the segments will not be used, the profile generator described herein may calculate only those profile stages that will be used in the final motion profile for a given trajectory, reducing computational overhead within the controller. The profile generator can automatically determine which segment(s) of the motion profile may be skipped for a given point-to-point move and calculate the remaining segments accordingly.

According to another aspect, one or more embodiments of the profile generator described herein can further improve the accuracy and efficiency of a point-to-point move by forcing the total profile time to be a multiple of the motion controller's sample time. In an exemplary technique, the profile generator can calculate a time-optimal solution for a given point-to-point move, determine the time durations of the respective segments of the resultant profile, and round these durations to be multiples of the sample time. The profile generator can then recalculate the jerk, acceleration/deceleration, velocity and/or position references for the profile to be consistent with these rounded profile times. Thus, the trajectory outputs can be aligned with the sample points, mitigating the need to compensate for small differences introduced when the total profile time falls between two sample times.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
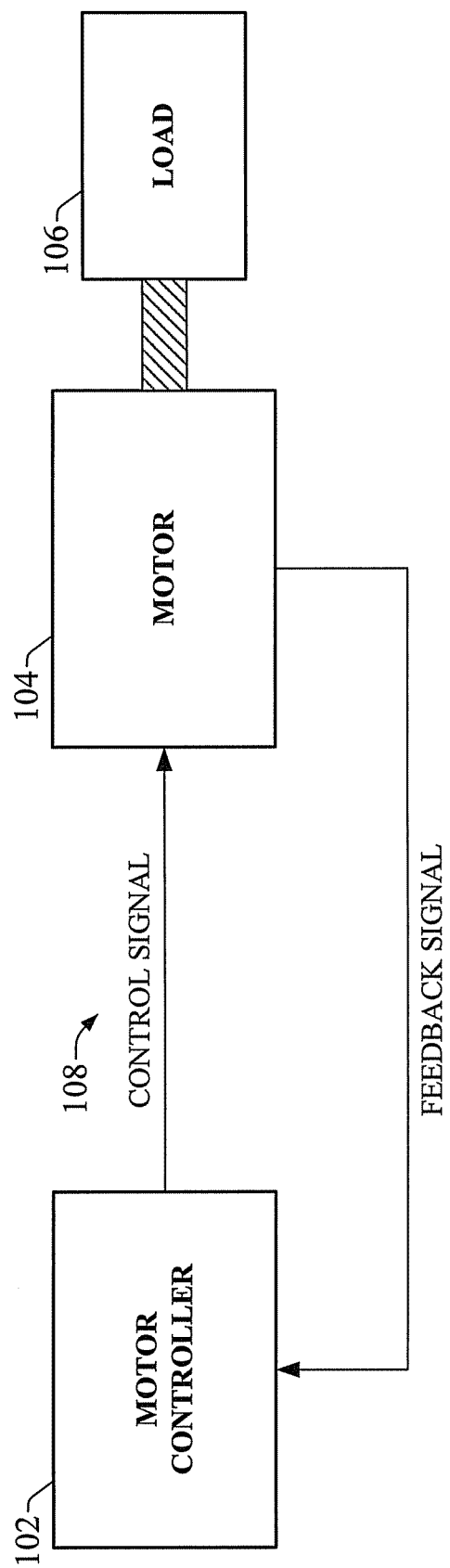
FIG. 1 is a block diagram of a simplified closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate to techniques for generating constraint-based, time-optimal motion profiles for point-to-point movement of a controlled mechanical system. In some embodiments, a generated motion profile can include a continuous jerk reference for at least one segment of the profile, where the jerk reference is calculated as a continuous time-varying function. The jerk reference refers to a function calculated by the profile generator that defines the jerk control output as a function of time for a given point-to-point trajectory.

To illustrate an exemplary context for the profile generation techniques described herein, FIG. 1 depicts a simplified closed-loop motion control architecture. Motor controller 102 is programmed to control motor 104, which drives mechanical load 106. Motor controller 102, motor 104, and load 106 comprise the main components of an exemplary motion control system, wherein linear and/or rotational motion of the load 106 is controlled by motor controller 102. In an exemplary non-limiting application, load 106 can represent an axis of a single- or multi-axis robot or positioning system in which the position of the load 106 is controlled in response to position instructions generated by motor controller 102. In such applications, motor controller 102 sends control signal 108 instructing the motor 104 to move the load 106 to a desired position. The control signal 108 can be provided directly to the motor 104, or to a motor drive (not shown) that controls the speed and direction of the motor by varying the power delivered to the motor 104 in accordance with the control signal 108. Feedback signal 110 indicates a current state (e.g., position, velocity, etc.) of the motor 104 and/or load 106 in substantially real-time. In servo-driven systems, feedback signal 110 can be generated, for example, by an encoder or resolver (not shown) that tracks an absolute or relative position of the motor. In sensorless systems lacking a velocity sensor, the feedback signal can be provided by a speed/position estimator. During a move operation, the motor controller 102 monitors feedback signal 110 to ensure that the load 106 has accurately reached the target position. Motor controller 102 compares the actual position of the load as indicated by the feedback signal 110 with the target position, and adjusts the control signal 108 as needed to reduce or eliminate error between the actual and target positions.

In another exemplary scenario, the motion control application can be a speed control system in which the velocity of the load 106 is controlled in accordance with velocity control instructions generated by motor controller 102. In this example, motor controller 102 provides an instruction to motor 104 (via control signal 108) to transition from a first velocity to a second velocity, and makes necessary adjustments to the control signal 108 based on feedback signal 110.

It is to be appreciated that the motion profile generation techniques of the present disclosure are not limited to use with the exemplary types of motion control systems described above, but are applicable for any suitable motion control application. For example, some motion control systems may operate in an open-loop configuration, omitting feedback signal 110.

In some applications, motor controller 102 will control motor 104 in accordance with motion profiles calculated by a higher-level control program, such as a program executed by a programmable logic controller (PLC) or other such controller. In such applications, the higher-level controller will determine the required target position and/or velocity of the motion device, and provide a motion profile to the motor controller 102 for transitioning the load 106 to the target position and/or velocity.

Figure 2:
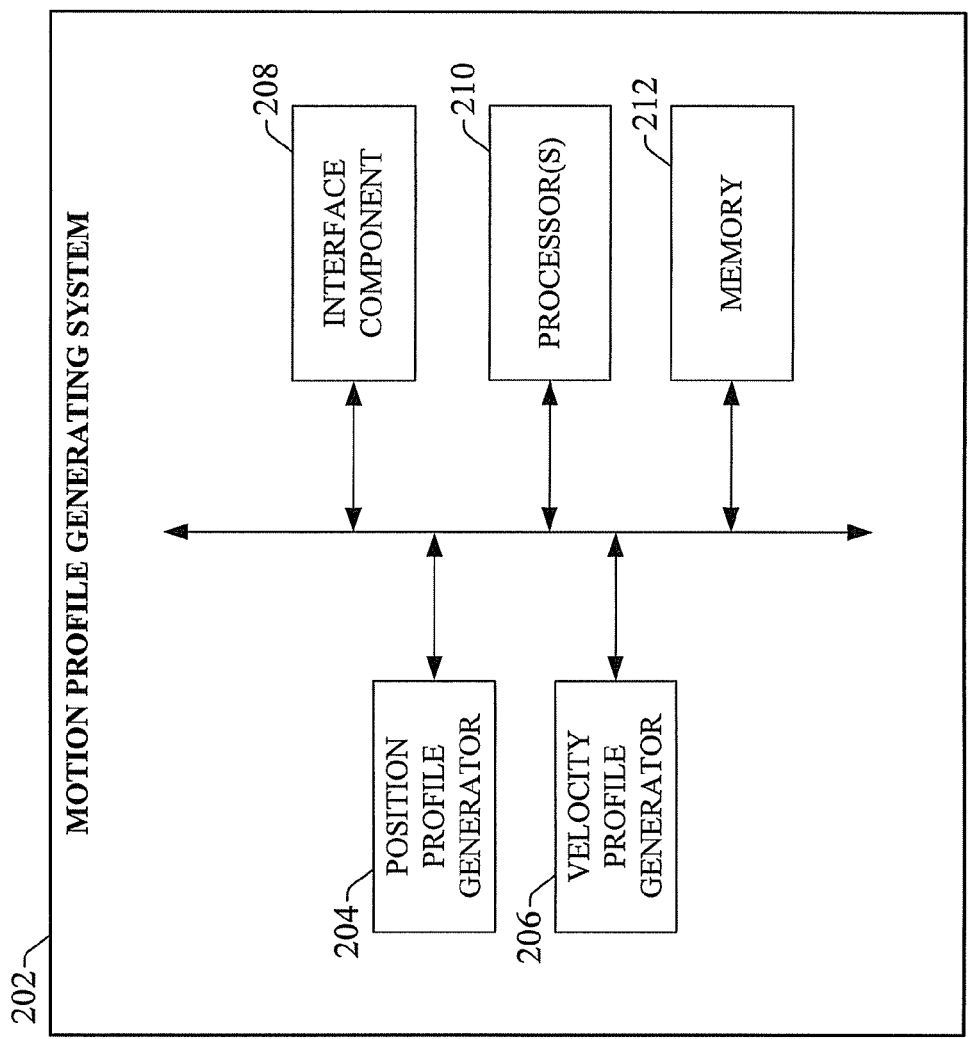
FIG. 2 is a block diagram of an exemplary motion profile generating system capable of generating motion profiles in a motion control system.

FIG. 2 is a block diagram of an exemplary non-limiting motion profile generating system capable of generating motion profiles for, point-to-point moves of a motion control system. Motion profile generating system 202 can include a position profile generator 204, a velocity profile generator 206, an interface component 208, one or more processors 210, and memory 212. In various embodiments, one or more of the position profile generator 204, velocity profile generator 206, interface component 208, the one or more processors 210, and memory 212 can be electrically and/or communicatively coupled to one another to perform one or more of the functions of the motion profile generating system 202. In some embodiments, components 204, 206, and 208 can comprise software instructions stored on memory 212 and executed by processor(s) 210. The motion profile generating system 202 may also interact with other hardware and/or software components not depicted in FIG. 2. For example, processor(s) 210 may interact with one or more external user interface devices, such as a keyboard, a mouse, a display monitor, a touchscreen, or other such interface devices.

Interface component 208 can be configured to receive user input and to render output to the user in any suitable format (e.g., visual, audio, tactile, etc.). User input can be, for example, user-entered constraints (e.g., maximum acceleration, maximum velocity, etc.) used by the motion profile generating system 202 to calculate a motion profile (to be described in more detail below). Position profile generator 204 can be configured to receive an indication of a desired target position for a motion system and calculate a motion profile for transitioning to the target position within the parameters of the user-defined constraints. Similarly, velocity profile component 206 can receive an indication of a desired target velocity for the motion control system and generate a motion profile for transitioning the motion system from a current velocity to the target velocity in conformance with the defined constraints. While FIG. 2 depicts the motion profile generating system as including both the position profile generator 204 and the velocity profile generator 206, It is to be appreciated that some embodiments of the motion profile generating system 202 may include only one of the position profile generator 204 or the velocity profile generator 206 without deviating from the scope of this disclosure. The one or more processors 210 can perform one or more of the functions described herein with reference to the systems and/or methods disclosed. Memory 212 can be a computer-readable storage medium storing computer-executable instructions and/or information for performing the functions described herein with reference to the systems and/or methods disclosed.

Figure 3:
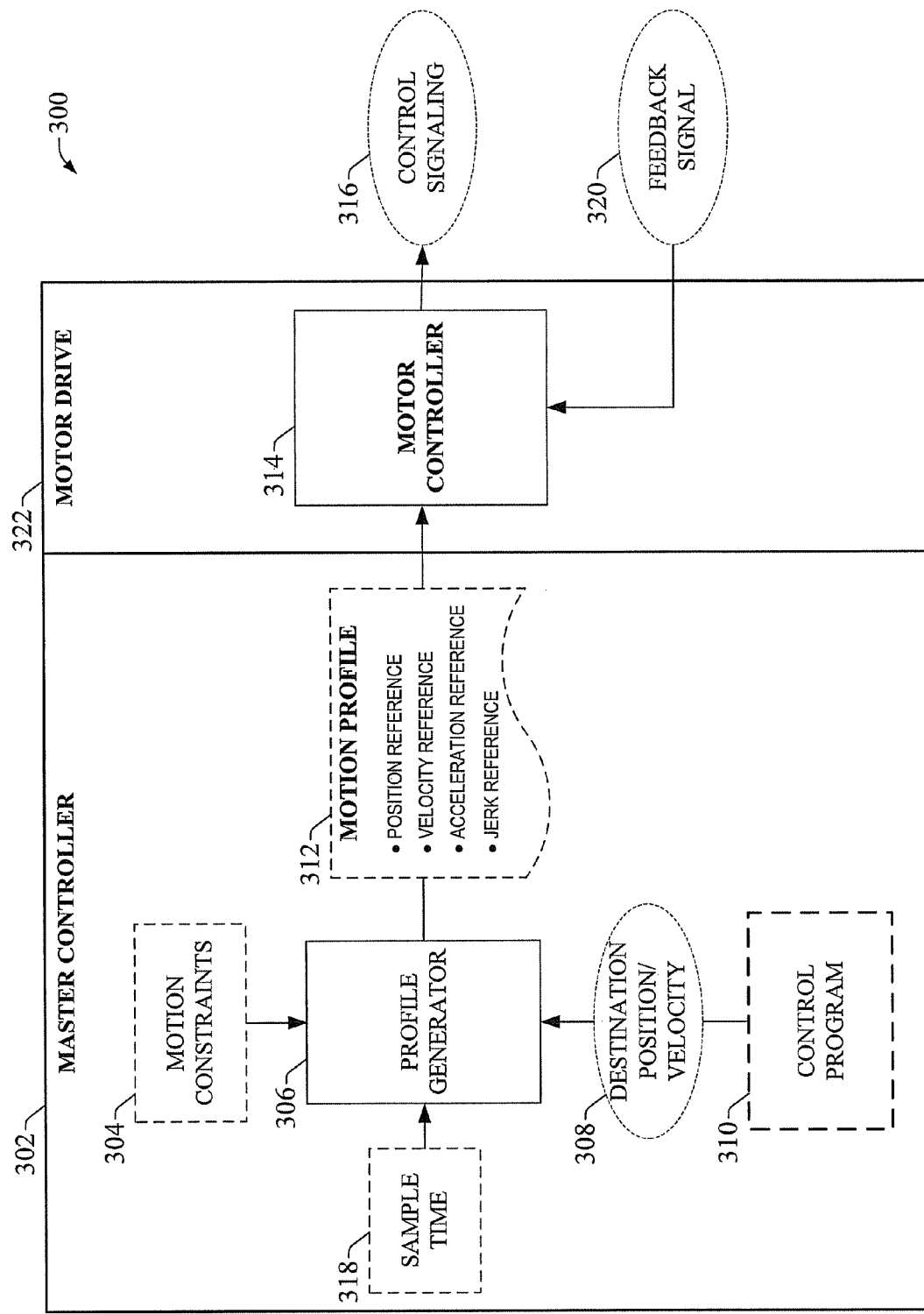
FIG. 3 is a block diagram of exemplary motion controller that utilizes a profile generator.

In some embodiments, the profile generator described herein can be an integrated component of a motion controller. FIG. 3 illustrates an exemplary motion control system 300 comprising a master controller 302 that utilizes a profile generator 306 according to one or more embodiments of this disclosure. Master controller 302 can be, for example, a programmable logic controller (PLC) or other such controller that monitors and controls a system (e.g., an industrial process, an automation system, a batch process, etc.) that includes one or more motion devices. In this example, profile generator 306 can be a functional component of the controller's operating system and/or control software executed by one or more processors residing on the controller 302. Profile generator 306 can also be a hardware component residing within controller 302, such as a circuit board or integrated circuit, that exchanges data with other functional elements of the controller 308. Other suitable implementations of profile generator 306 are also within the scope of certain embodiments of this disclosure. For example, although profile generator 306 is illustrated in FIG. 3 as being an integrated component of controller 302; the profile generator 306 may be a separate element from controller 302 in some embodiments. For such configurations, profile generator 306 can exchange data with controller 302 or other elements of the motion system via any suitable communications means, including but not limited to wired or wireless networking, hardwired data links, or other such communication means.

Exemplary motion control system 300 also comprises a motor drive 322, which includes a motor controller 314 for controlling a motion device (e.g., a motor, not shown) in accordance with a motion profile 312 provided by master controller 302. The motion profile 312 defines a trajectory for transitioning the motion device from a current position or velocity to a target position or velocity, where the trajectory is defined in terms of one or more of a position reference, a velocity reference, an acceleration reference, and/or a jerk reference. In response to receiving motion profile data from master controller 302, motor controller 314 will translate the motion profile 312 into control signaling 316, which is sent to the motion device to effect transitioning of the motion device to the target position or velocity. If the motor controller 314 is a closed-loop controller, motor controller 314 will also monitor a feedback signal 320 indicating an actual state of the motion device (e.g., the real-time position, velocity, etc.) as the control signaling 316 is being applied. Based on this feedback signal 320, the motor controller 314 will adjust the control signaling 316 as necessary to ensure that the motion device moves in accordance with the motion profile 312 as closely as possible. Alternatively, if the motor controller 314 is an open-loop controller, the motor controller 314 will still generate control signaling 316 based on motion profile 312, but will not monitor the feedback signal 320 during the resulting move.

In the present example, master controller 302 controls the system in accordance with a control program 310, which is stored and executed on the controller 302. During operation, control program 310 may require that the motion device move to a new position, or transition to a new velocity. The destination position or velocity 308 is provided to profile generator 306, which calculates a motion profile 312 that defines a trajectory for the move. Profile generator 306 calculates the motion profile 312 as a function of one or more motion constraints 304, which can represent mechanical constraints of the motion system or user preferences regarding operation of the motion device. Motion constraints 304 can be provided by the user prior to operation (e.g., via interface component 208 of FIG. 2). In some embodiments, profile generator 306 can also calculate the motion profile 312 based additionally on the sample time 318 of the controller 302, to ensure that the profile segments align with the controller's sample points, as will be discussed in more detail below.

As will be described in more detail below, motion profile 312 can define the trajectory of the point-to-point move over time in terms of one or more of a position reference, a velocity reference, an acceleration reference, and a jerk reference. These references represent functions calculated by the motion profile generator 306 defining how the respective motion attributes will be controlled as a function of time for a given point-to-point move. These references are mathematically related to one another as derivatives. That is, jerk is the derivative of acceleration, acceleration is the derivative of velocity, and velocity is the derivative of position. Profile generator 306 can calculate these references for respective stages of the trajectory profile, as will be discussed in more detail below.

Once the motion profile 312 for the move is calculated, profile generator 306 provides the motion profile 312 to the motor controller 314, which translates the motion profile 312 into control signaling 316 that instructs the motion device to perform the desired point-to-point move in accordance with the motion profile 312. As described above, if the motor controller 314 is a closed-loop controller, control signaling 316 will be a function of the motion profile 312 as well as feedback signal 320, which informs the motor controller 314 of the actual state of the motion device in real-time. For open-loop control systems, the control signaling 316 will be a function only of the motion profile 312.

It is to be understood that the architecture depicted in FIG. 3 is only intended to be an exemplary context in which profile generator 306 may operate, and that other operating contexts are within the scope of this disclosure. For example, in some scenarios, master controller 302 may be a self-contained controller that includes integrated motor control capabilities. In such applications, the controller 302 may itself translate the motion profile 312 into a suitable control signal 316 and send this control signal 316 to the motion device, rather than providing the motion profile 312 to a separate motor drive 322. In another exemplary architecture, profile generator 306 may be an integrated component of motor drive 322.

Figure 4:
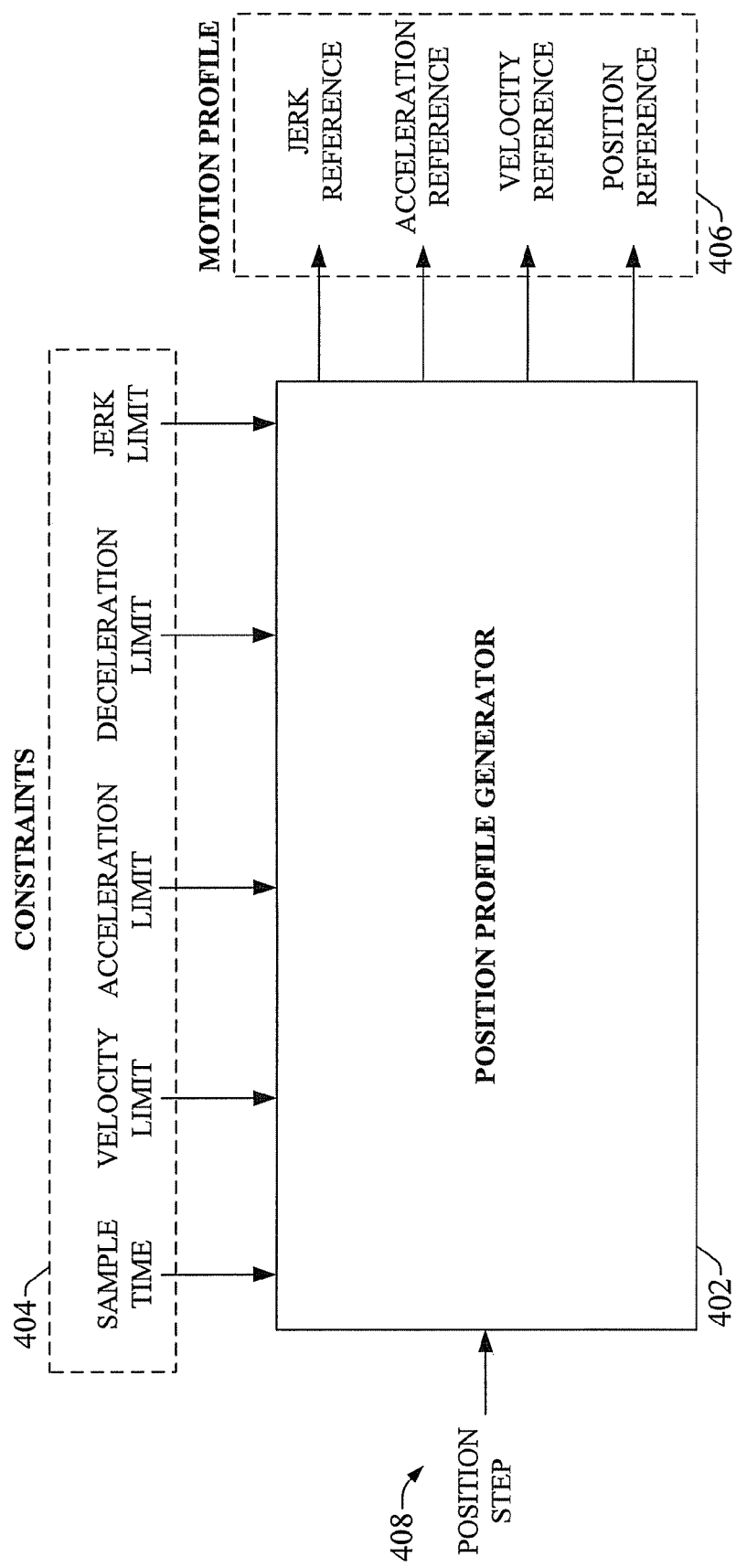
FIG. 4 is a block diagram illustrating the inputs and outputs of an exemplary position profile generator.
Figure 5:
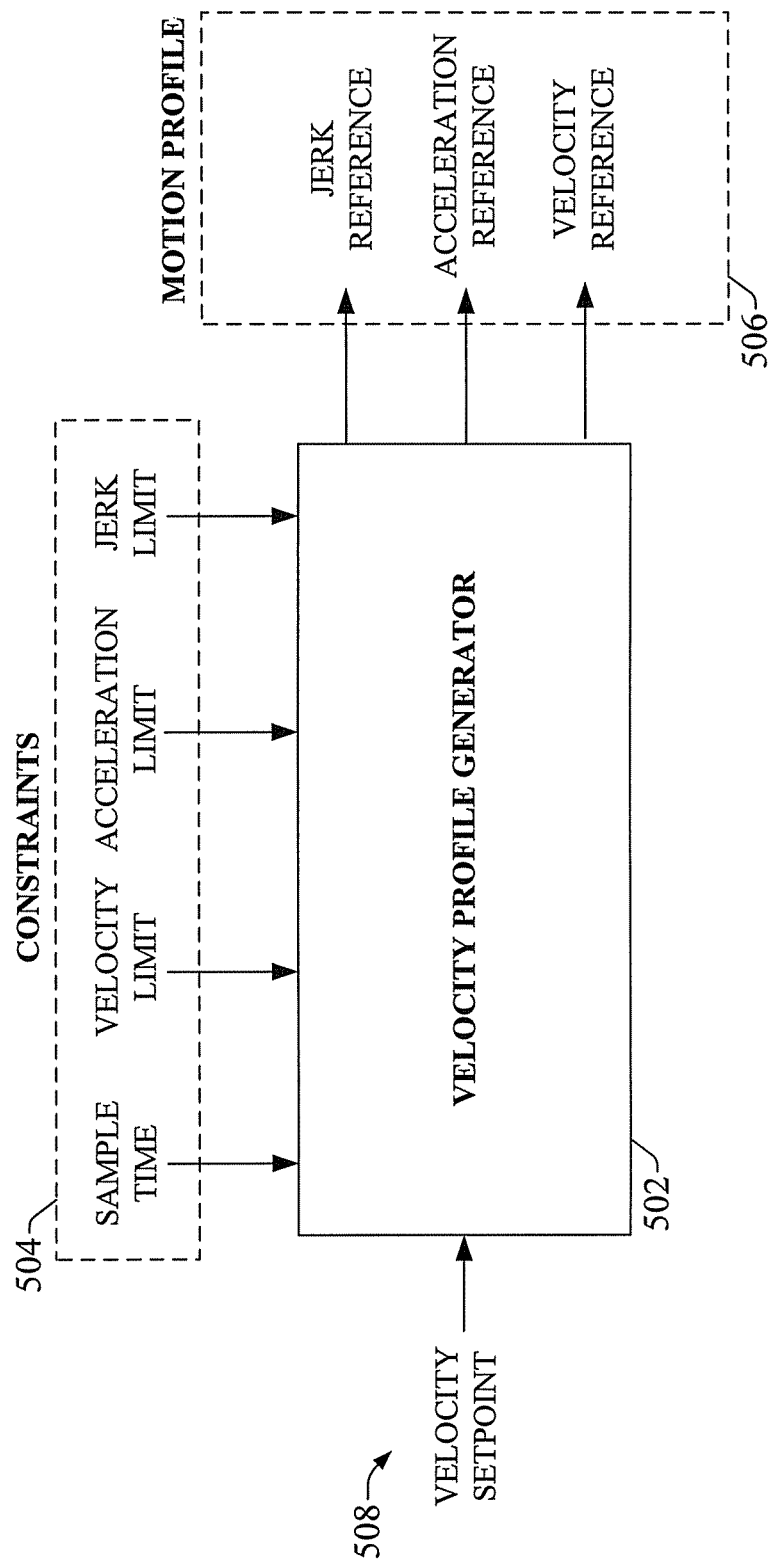
FIG. 5 is a block diagram illustrating the inputs and outputs of an exemplary velocity profile generator.

Profile generator 306 can be one or both of a position profile generator or a velocity profile generator. These two types of profile generators are illustrated in FIGS. 4 and 5, respectively. As shown in FIG. 4, position profile generator 402 receives as inputs a set of constraints 404, which can represent mechanical constraints of the controlled system or user preferences regarding behavior of the motion system. These constraints can include upper limits on the velocity, acceleration, deceleration, and jerk, as well as a sample time representing an update period of the controller's control signal (typically measured in milliseconds). These constraint values may be set by the user (e.g., via interface component 208 of FIG. 2), although in some embodiments the position profile generator 402 may determine the controller's sample time automatically. These constraints 404 may be set once during deployment of the motion control system, or may be reconfigured for each move. Position profile generator 402 allows the acceleration and deceleration limits to be configured individually to accommodate profiles having asymmetrical acceleration and deceleration. The sample time is used by the profile generator 402 to improve accuracy of the motion profile, as will be described in more detail below.

During operation, the position profile generator 402 will receive a position step command 408 specifying a new target position for the motion system. Position step command 408 may be generated by the control program executing on the controller (e.g., control program 310 of FIG. 302), or may be a move instruction manually input by a user. In response to the position step command 408, position profile generator calculates a constraint-based, time-optimal motion profile 406 defining a trajectory for moving the load from its current position to the target position defined by the position step command 408. The motion profile 406 comprises one or more of a jerk reference, an acceleration reference, a velocity reference, or a position reference (which are mathematically related to each other as derivatives). Position profile generator 402 defines these references as functions of time for each of a set of defined motion profile stages or segments. Table 1 summarizes the seven segments of a point-to-point motion profile.

TABLE 1

| No. | Segment Name | Description |
| --- | --- | --- |
| 1 | ACC_INC | Acceleration profile increases from zero to maximum acceleration |
| 2 | ACC_HOLD | Acceleration profile stays constant as the maximum acceleration |
| 3 | ACC_DEC | Acceleration profile decreases from maximum acceleration to zero |
| 4 | VEL_HOLD | Velocity profile stays constant |
| 5 | DEC_INC | Acceleration profile absolute value increases from zero to maximum deceleration |
| 6 | DEC_HOLD | Acceleration profile absolute value stays constant as the maximum deceleration |
| 7 | DEC_DEC | Acceleration profile absolute value decreases from maximum deceleration to zero |

Initially, during the first stage (ACC_INC), the acceleration increases continuously from zero to a constant acceleration. In some scenarios, this constant acceleration will be the maximum acceleration defined by constrains 404. However, for relatively short position steps this the position profile generator 402 may determine that a smaller acceleration would result in a more accurate transition to the target position. During the second stage (ACC_HOLD), the acceleration is held at the constant rate. As the system approaches the target velocity calculated by the position profile generator 402, the third stage (ACC_DEC) is entered, during which the acceleration is gradually decreased until the constant velocity is reached. When the constant velocity has been achieved, this constant velocity is held during the fourth stage (VEL_HOLD) as the system approaches the target position. When the system is near the target position, the trajectory enters the fifth stage (DEC_INC), during which the system begins decelerating at a gradually increasing rate from zero to a target deceleration defined by the motion profile. When the target deceleration is reached, this deceleration is held during the sixth stage (DEC_HOLD). Finally, during the seventh stage (DEC_DEC), the deceleration is gradually decreased until the system reaches zero velocity, ending the move sequence.

When provided with a position step command 408, position profile generator 402 determines which of these seven profile segments are required for a time-optimal motion profile, and calculates one or more of a time varying jerk reference, acceleration reference, velocity reference, or position reference for each segment deemed necessary for the move. The calculated references for the respective stages are combined to yield a complete motion profile, which can be used by an open-loop or closed-loop motion controller (e.g., a motor drive) to drive the motion system through the trajectory defined by the motion profile.

FIG. 5 illustrates an exemplary velocity profile generator 502 according to one or more embodiments. Velocity profile generator 502 is similar to position profile generator 402, but is used to calculate motion profiles in response to a desired change in velocity rather than a change in position. That is, velocity profile generator 502 calculates a time-optimal motion profile 506 for transitioning a motion system from a current velocity to a target velocity specified by velocity setpoint 508. Since transition to a desired velocity setpoint is typically indifferent to the motion system's position, the constraints 504 defined for the velocity profile generator 502 may omit the position limit. Likewise, the motion profile 506 generated by velocity profile generator 502 may omit a position reference, and define the motion profile exclusively in terms of a time varying jerk reference, acceleration reference and/or velocity reference.

Figure 6:
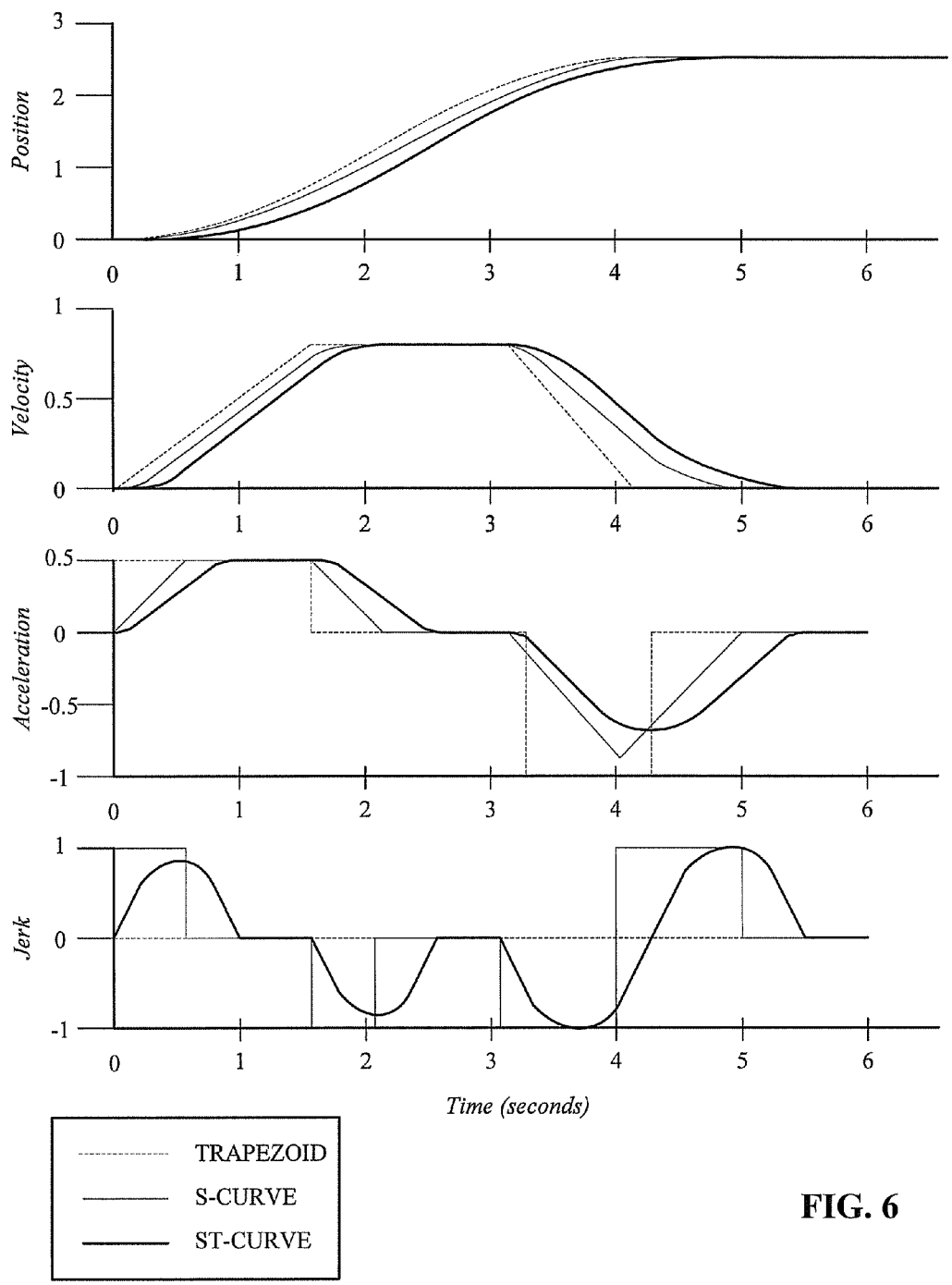
FIG. 6 is a graphical comparison of an exemplary ST-curve profile with traditional trapezoidal and S-curve profiles.

In some motion control applications, motion controllers generate one of either trapezoidal motion profiles or S-curve motion profiles. In addition to or instead of these profile types, the profile generator of the present disclosure can generate profiles according to a third profile type, referred to herein as an ST-curve profile. FIG. 6 compares an exemplary ST-curve profile with traditional trapezoidal and S-curve profiles. The time graphs illustrated in FIG. 6 plot the position, velocity, acceleration, and jerk for a given motion trajectory between position 0 (the start position) and position 2.5 (the target position, as may be defined by position step command 408 of FIG. 4). As is generally understood, the plotted values are mathematically related to one another as derivatives. That is, velocity is the derivative of position (i.e., the rate of change of position), acceleration is the derivative of velocity, and jerk is the derivative of acceleration.

Trapezoidal motion profiles only employ three of the seven profile stages described above—constant acceleration (stage 2), constant velocity (stage 4), and constant deceleration (stage 6). This results in the trapezoidal velocity profile depicted by the dotted line of the velocity curve in FIG. 6. The abrupt transitions between the constant acceleration/deceleration stages and the constant velocity stage results in sharp corners at the top of the trapezoidal velocity curve. Since the acceleration and deceleration phases of the trapezoidal profile are always constant, the acceleration curve for this profile steps abruptly between constant values, as illustrated by the dotted line on the acceleration graph. In the present example, the rate of deceleration is twice that of acceleration, so the acceleration curve for the trapezoidal case steps to 0.5 during the acceleration stage, 0 for the constant velocity stage, and −1.0 for the deceleration stage. Also, the jerk curve (representing the rate of change of acceleration/deceleration) pulses briefly during moments of transition (not plotted) and remains at zero when acceleration or deceleration remains constant, as shown by the dotted line on the jerk graph of FIG. 6.

Since the trapezoidal profile always accelerates and decelerates at a constant rate without gradual transitioning to and from the constant velocity stage, the trapezoidal curve profile can traverse the distance between the current position and the target position relatively quickly. However, the sudden transitions between acceleration/deceleration and constant (or zero) velocity can introduce undesirable mechanical turbulence in the system. Additionally, since the deceleration does not decrease gradually as the motion system approaches the target position, but instead maintains constant deceleration until the target position is reached before suddenly shifting to zero velocity, the trapezoidal motion profile has a high likelihood of overshooting the target position at the end of the initial traversal, requiring the controller to apply a compensatory control signal to bring the load back to the target position. This process may need to be iterated several times before the system settles on the target position, introducing undesirable system oscillations.

In contrast to the trapezoidal profile, the S-curve profile (depicted as the light solid line in the graphs of FIG. 6) utilizes all the continuous acceleration/deceleration stages of the seven profile stages, thereby allowing gradual transitions between the constant (or zero) velocity phases and the constant acceleration/deceleration stages. These gradual acceleration transitions can be seen clearly on the acceleration graph. Rather than starting at a constant acceleration from time 0, as does the trapezoidal profile, the acceleration for the S-curve profile ramps gradually to constant acceleration starting at time 0. When the velocity has reached maximum (between 1 s and 2 s), the acceleration gradually decreases to zero to achieve constant velocity, rather than stepping down abruptly to zero as in the trapezoidal case. Similar gradual changes in acceleration can be seen during the later deceleration stages for the S-curve profile. The effect of these gradual acceleration changes on the velocity and position curves can be seen on the respective velocity and position graphs. In particular, the corners of the S-curve velocity profile are rounder relative to those of the trapezoidal curve, representing a smoother transition between the acceleration/deceleration stages and the constant velocity stages. Likewise, the S-curve position profile shows a smoother transition between the initial position and the target position, though at the expense of additional time required to reach the target.

One or more embodiments of the profile generator described herein can support generation of S-curve motion profiles. Conventionally, motion control systems that utilize S-curve motion profiles only support symmetrical acceleration and deceleration; that is, the absolute values of the constant acceleration and the constant deceleration stages are equal. By contrast, the profile generator described herein can support S-curve motion profiles having asymmetrical acceleration and deceleration. This is illustrated on the acceleration graph of FIG. 6, which depicts the S-curve as having a limit of 0.5 during acceleration, and a limit of −1 during deceleration. To provide for such asymmetric acceleration and deceleration, the profile generator can allow separate acceleration and deceleration limits to be configured as system constraints (see, e.g., constraints 404 of FIG. 4), and calculate the motion profile in view of these constraints.

As illustrated on the jerk graph, the rate at which the acceleration/deceleration increases and decreases during stages 1, 3, 5, and 7 of the motion profile for the S-curve case are always constant. That is, the jerk is always a constant value for any given stage of the motion profile—either 1, 0, or −1 in the present example. This can result in sharp transitions between the increasing/decreasing acceleration (or deceleration) stages and constant acceleration stages, as illustrated on the acceleration graph.

To facilitate smoother motion than that offered by the trapezoidal and S-curve profiles of conventional motion control systems while achieving time-optimal transition between positions, one or more embodiments of the profile generator described herein can calculate motion profiles that accord to the ST-curve profile type. An exemplary ST-curve profile is represented as the dark solid line on the graphs of FIG. 6. In contrast to the trapezoidal and S-curve profiles, the ST-curve profile gradually varies the jerk continuously over time during the stages of increasing and decreasing acceleration and deceleration. This can result in the smoother acceleration transitions illustrated on the acceleration graph of FIG. 6, and the corresponding smoother velocity and position curves shown in the respective velocity and position graphs.

Moreover, ST-curve profiles can support asymmetrical acceleration and deceleration (that is, the profile generator can calculate profiles having rates of acceleration that differ from the rates of deceleration for a given motion profile). Deriving a mathematical trajectory expression as a function of time while simultaneously finding a time-optimal solution can be challenging when using asymmetric acceleration/deceleration. To address this concern, one or more embodiments of the profile generator described herein can employ an algorithm that leverages a relationship between acceleration and deceleration, and between acceleration jerk and deceleration jerk, and substitute these relationships during the derivation, making it possible to derive the analytical expressions of the trajectories and then find the time-optimal solution.

An exemplary ST-curve position profile is derived below. One or more embodiments of the profile generator described herein can generate motion profile references based on the following derivations. However, it is to be understood that the profile generator described herein is not limited to this technique for generating motion profiles based on ST-curves, and that any suitable algorithm that yields a continuous jerk curve defined as a function of time is within the scope of this disclosure.

In the following equations, $\dddot{\theta}$, $\ddot{\theta}$, $\dot{\theta}$, and $\theta$ are jerk, acceleration, velocity, and position, respectively. $t_1$, $t_2$, $t_3$, $t_4$ and $t_5$ are the respective durations of the ACC_INC, ACC_HOLD, VEL_HOLD, DEC_INC, and DEC_HOLD stages of the motion profile (see Table 1 above). In the present example, it is assumed that ACC_INC and ACC_DEC are equal in duration, and thus $t_1$ is the duration of both the ACC_INC and ACC_DEC stages. Likewise, DEC_INC is assumed to be equal in duration to DEC_DEC, so $t_4$ is the duration for both DEC_INC and DEC_DEC. K is a gain value to be determined for each stage of the motion profile for each of the jerk, acceleration, velocity, and position, according to the following equations (where, for each of the seven stages, t=0 represents the start time of the respective stage):

$$\dddot{\theta}(t) = K \begin{cases} t(t_1 - t) & 0 \le t \le t_1 \\ 0 & 0 \le t \le t_2 \\ -t(t_1 - t) & 0 \le t \le t_1 \\ 0 & 0 \le t \le t_3 \\ -t(t_4 - t) & 0 \le t \le t_4 \\ 0 & 0 \le t \le t_5 \\ t(t_4 - t) & 0 \le t \le t_4 \end{cases} \quad (1)$$

$$\ddot{\theta}(t) = K \begin{cases} t^2 \frac{3t_1 - 2t}{6} & 0 \le t \le t_1 \\ \frac{t_1^3}{6} & 0 \le t \le t_2 \\ \frac{t_1^3}{6} + t^2 \frac{2t - 3t_1}{6} & 0 \le t \le t_1 \\ 0 & 0 \le t \le t_3 \\ t^2 \frac{2t - 3t_4}{6} & 0 \le t \le t_4 \\ -\frac{t_4^3}{6} & 0 \le t \le t_5 \\ -\frac{t_4^3}{6} + t^2 \frac{3t_4 - 2t}{6} & 0 \le t \le t_4 \end{cases} \quad (2)$$

$$\dot{\theta}(t) = K \begin{cases} \frac{t^3}{12}(2t_1 - t) & 0 \le t \le t_1 \\ \frac{t_1^3(2t + t_1)}{12} & 0 \le t \le t_2 \\ \frac{t_1^3(t_1 + t_2)}{6} - \frac{1}{12}(t + t_1)(t_1 - t)^3 & 0 \le t \le t_1 \\ \frac{t_1^3(t_1 + t_2)}{6} & 0 \le t \le t_3 \\ \frac{t_1^3(t_1 + t_2)}{6} - \frac{t^3}{12}(2t_4 - t) & 0 \le t \le t_4 \\ \frac{t_1^3(t_1 + t_2)}{6} - \frac{t_4^3}{12}(2t + t_4) & 0 \le t \le t_5 \\ \frac{t_1^3(t_1 + t_2)}{6} - \frac{t_4^3(t_4 + t_5)}{6} + \frac{(t_4 + t)^3(t + t_4)}{12} & 0 \le t \le t_4 \end{cases} \quad (3)$$

$$\theta(t) = K \begin{cases} \frac{t^4}{120}(5t_1 - 2t) & 0 \le t \le t_1 \\ \frac{t_1^5}{40} + \frac{t_1^3(t + t_1)}{12} & 0 \le t \le t_2 \\ \frac{t_1^3}{12}(t_1 + t_2)(2t + t_2) + \frac{2t + 3t_1}{120}(t_1 - t)^4 & 0 \le t \le t_1 \\ \frac{t_1^3(t_1 + t_2)}{12}(2t + 2t_1 + t_2) & 0 \le t \le t_3 \\ \frac{t_1^3(t_1 + t_2)}{12}(2t + 2t_3 + 2t_1 + t_2) + \frac{t^5}{60} - \frac{t_4 t^4}{24} & 0 \le t \le t_4 \\ \frac{t_1^3(t_1 + t_2)}{12}\left(\frac{2t + 2t_4 + 2t_3 +}{2t_1 + t_2}\right) - \frac{t_4^5}{40} - \frac{t_4^3 t^2}{12} - \frac{t_4^4 t}{12} & 0 \le t \le t_5 \\ \frac{t_1^3(t_1 + t_2)}{12}\left(\frac{t_5 + 2t_4 + 2t_3 +}{2t_1 + t_2}\right) - \frac{(t_4 - t)^4(2t + 3t_4)}{120} & 0 \le t \le t_4 \end{cases} \quad (4)$$

Given these relationships, the maximum acceleration jerk, maximum deceleration jerk, maximum acceleration, maximum deceleration, and maximum velocity can be described in terms of the segment durations:

$$K = P \frac{12}{t_1^3(t_1 + t_2)(t_5 + 2t_4 + 2t_3 + 2t_1 + t_2)} \quad (5)$$

$$J = P \frac{3}{t_1(t_1 + t_2)(t_5 + 2t_4 + 2t_3 + 2t_1 + t_2)} \quad (6)$$

$$I = P \frac{3}{t_4(t_4 + t_5)(t_5 + 2t_4 + 2t_3 + 2t_1 + t_2)} \quad (7)$$

$$A = P \frac{2}{(t_1 + t_2)(t_5 + 2t_4 + 2t_3 + 2t_1 + t_2)} \quad (8)$$

$$D = P \frac{2}{(t_4 + t_5)(t_5 + 2t_4 + 2t_3 + 2t_1 + t_2)} \quad (9)$$

$$V = P \frac{2}{(t_5 + 2t_4 + 2t_3 + 2t_1 + t_2)} \quad (10)$$

where:
P is the position step,
J is the maximum acceleration jerk,
I is the maximum deceleration jerk,
A is the maximum acceleration,
D is the maximum deceleration, and
V is the maximum velocity.

The relationships among P, V, A, D, J, I, $t_1$, $t_2$, $t_3$, $t_4$, and $t_5$ can now be obtained:

$$t_1^3(t_1 + t_2) = t_4^3(t_4 + t_5) \quad (11)$$

$$t_1 = \frac{3A}{2J} \quad (12)$$

$$t_4 = \frac{3D}{2I} \quad (13)$$

$$t_2 = \frac{V}{A} - \frac{3A}{2J} \quad (14)$$

$$t_5 = \frac{V}{D} - \frac{3D}{2I} \quad (15)$$

$$t_3 = \frac{P}{V} - \frac{3A}{4J} - \frac{V}{2A} - \frac{3D}{4I} - \frac{V}{2D} \quad (16)$$

-continued $$\frac{A^2}{D^2} = \frac{J^3}{I^3} \quad (17)$$

Given that $t_1$, $t_2$, $t_3$, $t_4$, and $t_5$ should all be greater than or equal to zero, and assuming that $$\frac{D}{A} = \rho \quad (18)$$

$$\frac{I}{J} = \rho^{\frac{2}{3}} \quad (19)$$

the following set of inequalities can be established:

$$V \geq \frac{3A^2}{2J} = \frac{3}{2I\rho^{\frac{4}{3}}}D^2 \quad (20)$$

$$V \geq \frac{3}{2I}D^2 \quad (21)$$

$$\frac{P}{V} \geq \frac{3}{4I}\rho^{-\frac{1}{3}}D + \frac{\rho}{2}\frac{V}{D} + \frac{3}{4I}D + \frac{1}{2}\frac{V}{D} \quad (22)$$

$$\frac{P}{V} \geq \left(\rho^{-\frac{1}{3}} + 1\right)\frac{3}{4I}D + \frac{1}{2}(\rho+1)\frac{V}{D} \quad (23)$$

Solving inequalities (20)-(23) yields appropriate values for V, A, D, J, and I (the maximum values for velocity, acceleration, deceleration, acceleration jerk, and deceleration jerk, respectively).

Substituting these maximum values into equations (12)-(16) can yield values for $t_1$, $t_2$, $t_3$, $t_4$, and $t_5$ (the durations of the respective segments of the motion profile). The values for V, A, D, J, I, $t_1$, $t_2$, $t_3$, $t_4$, and $t_5$ derived according to equations (1)-(23) above can produce a smooth, time-optimal trajectory that operates within the defined mechanical constraints or user demands.

Based on the relationships described above, the profile generator can calculate a suitable ST-curve motion profile for a given point-to-point move. It is recognized, however, that the values initially calculated for $t_1$, $t_2$, $t_3$, $t_4$, and $t_5$ may not be multiples of the controller's sample time, and consequently may not align with the sample points of the motion controller. When a profile segment duration falls between two controller sample points, it may be necessary for the controller to compensate for small differences between the desired control signal output and the actual control signal output. To address this issue, one or more embodiments of the profile generator described herein can perform an additional computation after the maximum values V, A, D, J, and I and the segment durations $t_1$, $t_2$, $t_3$, $t_4$, and $t_5$ have been derived as described above.

Specifically, after the profile generator has calculated $t_1$, $t_2$, $t_3$, $t_4$, and $t_5$ according to the above derivations, each of these duration values can be upper-rounded to the nearest sample time to yield $t_{1New}$, $t_{2New}$, $t_{3New}$, $t_{4New}$, and $t_{5New}$. This rounding step can be based on the sample time provided to the profile generator as one of the constraints 404 or 504. The profile generator can then calculate new values for V, A, D, J, and I using the rounded duration values $t_{1New}$, $t_{2New}$, $t_{3New}$, $t_{4New}$, and $t_{5New}$. This recalculation yields a final motion profile comprising segment durations that are multiples of the sample time, which can ensure that the control signal output by the controller is aligned with the controller's sample points, thereby mitigating the need to compensate for the small difference introduced when the motion profile times fall between two sample points.

Alternatively or in addition to the ST-curves described above, one or more embodiments of the profile generator described herein is capable of generating S-curve profiles having asymmetric acceleration and deceleration (see, e.g., the exemplary S-curve trajectory of FIG. 6). An exemplary S-curve profile having asymmetric acceleration and deceleration is derived below. One or more embodiments of the profile generator described herein can generate motion profile references based on the following derivations or variants thereof.

As in the ST-curve equations derived above, $\dddot{\theta}$, $\ddot{\theta}$, $\dot{\theta}$, and $\theta$ are jerk, acceleration, velocity, and position, respectively. $t_1$, $t_2$, $t_3$, $t_4$ and $t_5$ are the respective durations of the ACC_INC, ACC_HOLD, VEL_HOLD, DEC_INC, and DEC_HOLD stages of the motion profile (see Table 1 above). As in the ST-curve example, it is assumed that ACC_INC and ACC_DEC are equal in duration, and thus $t_1$ is the duration of both the ACC_INC and ACC_DEC stages. Likewise, DEC_INC is assumed to be equal in duration to DEC_DEC, so $t_4$ is the duration for both DEC_INC and DEC_DEC. K is a gain value to be determined for each stage of the motion profile for each of the jerk, acceleration, velocity, and position, according to the following equations (where, for each of the seven stages, t=0 represents the start time of the respective stage):

$$\dddot{\theta}(t) = K \begin{cases} 1, & 0 < t < t_1 \\ 0, & 0 < t < t_2 \\ -1, & 0 < t < t_1 \\ 0, & 0 < t < t_3 \\ -1, & 0 < t < t_4 \\ 0, & 0 < t < t_5 \\ 1, & 0 < t < t_4 \end{cases} \quad (24)$$

$$\ddot{\theta}(t) = K \begin{cases} t, & 0 < t < t_1 \\ t_1, & 0 < t < t_2 \\ t_1 - t, & 0 < t < t_1 \\ 0, & 0 < t < t_3 \\ -t, & 0 < t < t_4 \\ -t_4, & 0 < t < t_5 \\ t - t_4, & 0 < t < t_4 \end{cases} \quad (25)$$

$$\dot{\theta}(t) = K \begin{cases} \frac{1}{2}t^2, & 0 < t < t_1 \\ t_1\left(t + \frac{1}{2}t_1\right), & 0 < t < t_2 \\ \frac{t_1}{2}(2t_2 + t_1) + t_1 t - \frac{1}{2}t^2, & 0 < t < t_1 \\ t_1(t_2 + t_1), & 0 < t < t_3 \\ t_1(t_2 + t_1) - \frac{1}{2}t^2, & 0 < t < t_4 \\ t_1(t_2 + t_1) - \frac{1}{2}t_4^2 - t_4 t, & 0 < t < t_5 \\ t_1(t_2 + t_1) - t_4(t_4 + t_5) + \frac{1}{2}(t_4 - t)^2, & 0 < t < t_4 \end{cases} \quad (26)$$

-continued $$\theta(t) = \begin{cases} \frac{1}{6}t^3, & 0 < t < t_1 \\ \frac{1}{6}t_1^3 + \frac{1}{2}t_1(t+t_1)t, & 0 < t < t_2 \\ \frac{1}{2}t_1(t_2+t_1)(t_2+2t) + \frac{1}{6}(t_1-t)^3, & 0 < t < t_1 \\ \frac{1}{2}t_1(t_1+t_2)(2t_1+t_2+2t), & 0 < t < t_3 \\ \frac{1}{2}t_1(t_1+t_2)(2t_1+t_2+2t_3+2t) - \frac{1}{6}t^3, & 0 < t < t_4 \\ \frac{1}{2}t_1(t_1+t_2)\left(\begin{array}{c} 2t_1+t_2+ \\ 2t_3+2t_4+2t \end{array}\right) - \frac{1}{6}t_4^3 - \frac{1}{2}t_4^2t - \frac{1}{2}t_4t^2, & 0 < t < t_5 \\ \frac{1}{2}t_1(t_1+t_2)(2t_1+t_2+2t_3+2t_4+t_5) - \frac{1}{6}(t_4-t)^3, & 0 < t < t_4 \end{cases}$$ (27)

Given these relationships, the maximum acceleration jerk, maximum deceleration jerk, maximum acceleration, maximum deceleration, and maximum velocity can be described in terms of the segment durations:

$$K = P\frac{2}{t_1(t_1+t_2)(t_5+2t_4+2t_3+2t_1+t_2)}$$ (28)

$$J = I = K$$ (29)

$$A = P\frac{2}{(t_1+t_2)(t_5+2t_4+2t_3+2t_1+t_2)}$$ (30)

$$D = P\frac{2}{(t_4+t_5)(t_5+2t_4+2t_3+2t_1+t_2)}$$ (31)

$$V = P\frac{2}{t_5+2t_4+2t_3+2t_1+t_2}$$ (32)

where:
P is the position step,
J is the maximum acceleration jerk,
I is the maximum deceleration jerk,
A is the maximum acceleration,
D is the maximum deceleration, and
V is the maximum velocity.

The relationships among P, V, A, D, J, I, $t_1$, $t_2$, $t_3$, $t_4$, and $t_5$ can now be obtained:

$$t_1(t_1+t_2) = t_4(t_4+t_5)$$ (33)

$$t_1 = \frac{A}{J}$$ (34)

$$t_2 = \frac{V}{A} - \frac{A}{J}$$ (35)

$$t_4 = \frac{D}{J}$$ (36)

$$t_5 = \frac{V}{D} - \frac{D}{J}$$ (37)

$$t_3 = \frac{P}{V} - \frac{A}{2J} - \frac{V}{2A} - \frac{D}{2J} - \frac{V}{2D}$$ (38)

Given that $t_1$, $t_2$, $t_3$, $t_4$, and $t_5$ should all be greater than or equal to zero, and assuming that $$\frac{D}{A} = \rho$$ (39)

the following set of inequalities can be established:

$$V \geq \frac{A^2}{J} = \frac{1}{J\rho^2}D^2$$ (40)

$$V \geq \frac{1}{J}D^2$$ (41)

$$\frac{P}{V} \geq \frac{1}{2J}\rho^{-1}D + \frac{\rho}{2}\frac{V}{D} + \frac{1}{2J}D + \frac{1}{2}\frac{V}{D}$$ (42)

$$\frac{P}{V} \geq (\rho^{-1}+1)\frac{1}{2J}D + \frac{1}{2}(\rho+1)\frac{V}{D}$$ (43)

Solving inequalities (40)-(43) yields appropriate values for V, A, D, J, and I (the maximum values for velocity, acceleration, deceleration, acceleration jerk, and deceleration jerk, respectively) for the S-curve profile.

Substituting these maximum values into equations (34)-(38) can yield values for $t_1$, $t_2$, $t_3$, $t_4$, and $t_5$ (the durations of the respective segments of the S-curve motion profile). The values for V, A, D, J, I, $t_1$, $t_2$, $t_3$, $t_4$, and $t_5$ derived according to equations (24)-(43) above can produce an S-curve profile having asymmetrical acceleration and deceleration, and that operates within the defined mechanical constraints or user demands.

In some embodiments, the profile generator can adapt the resultant S-curve motion profile to the sample time of the controller by way of an additional calculation similar to that described above in connection with the ST-curve profile. That is, after calculating $t_1$, $t_2$, $t_3$, $t_4$, and $t_5$ according to the above derivations, the profile generator can upper-round these durations to the nearest sample time to yield new duration values $t_{1New}$, $t_{2New}$, $t_{3New}$, $t_{4New}$, and $t_{5New}$. The profile generator can then calculate new values for V, A, D, J, and I using the rounded duration values $t_{1New}$, $t_{2New}$, $t_{3New}$, $t_{4New}$, and $t_{5New}$.

While motion profiles typically comprise the seven stages listed in Table 1 above, some point-to-point moves may not require all seven segments. For example, if the distance between the current state of the motion system and the target state is relatively small, the VEL_HOLD (constant velocity) segment of the motion profile may be eliminated. Accordingly, one or more embodiments of the profile generator described herein may support automatic or intelligent segment skipping. That is, rather than perform calculations for all seven stages of the profile, even if one or more of the stages will not be used in the final trajectory, some embodiments of the profile generator described herein can calculate only those stages that will be used in the final trajectory for a given point-to-point move.

The motion profile can automatically determine which segments can be skipped during calculation of the motion profile when a new move command is received. In some embodiments, the profile generator may determine which segments may be skipped based in part on the total distance between the current position and the target position (in the case of a position change), or the difference between the current velocity and the target velocity (in the case of a velocity change), where smaller differences between the current and target state may suggest elimination of certain segments of the motion profile. In such embodiments, the difference between the current and target states may be compared with a set of defined difference ranges, where each defined difference range is associated with one or more segments that may be omitted from a corresponding motion profile.

One or more embodiments of the profile generator described herein may also infer which segments may be skipped based on historical motion data. For example, the profile generator may record a history of issued move commands and corresponding trajectory data (e.g., position, velocity, acceleration, and/or jerk over time) for the moves performed in response to the commands. The profile generator can analyze this historical data to make an inference regarding which segments may be omitted for a particular type of move. Thus, when a new point-to-point move command is received, prior to calculating the motion profile for the move, the profile generator can infer which segments may be skipped based on the shape of trajectories performed in response to past move commands having similar characteristics (e.g., similar distances to traverse, similar speeds at the time the move command was received, etc.).

Figure 7:
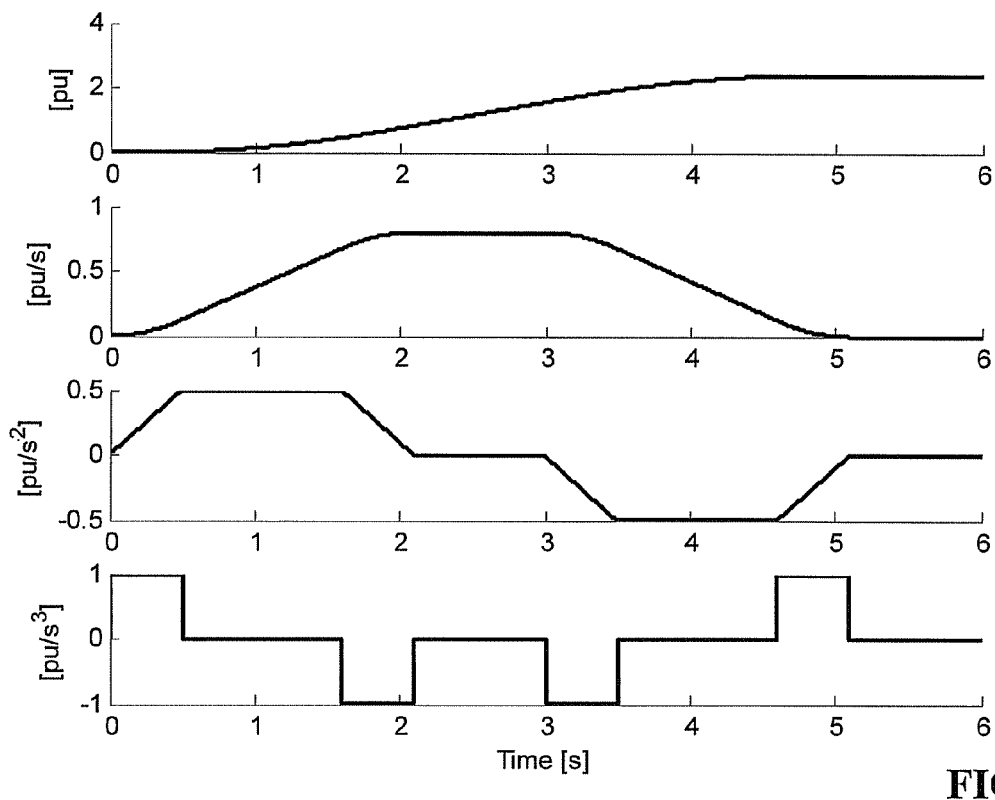
FIG. 7 illustrates an exemplary S-curve profile that utilizes all seven stages.
Figure 8:
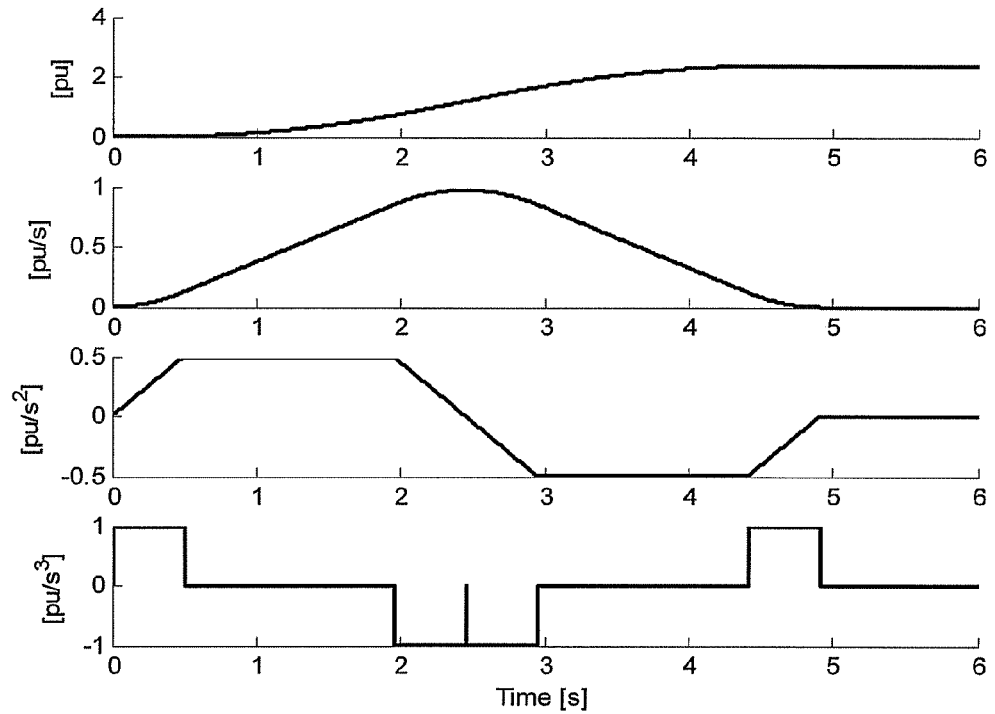
FIG. 8 illustrates an exemplary S-curve motion profile that skips the constant velocity stage.
Figure 9:
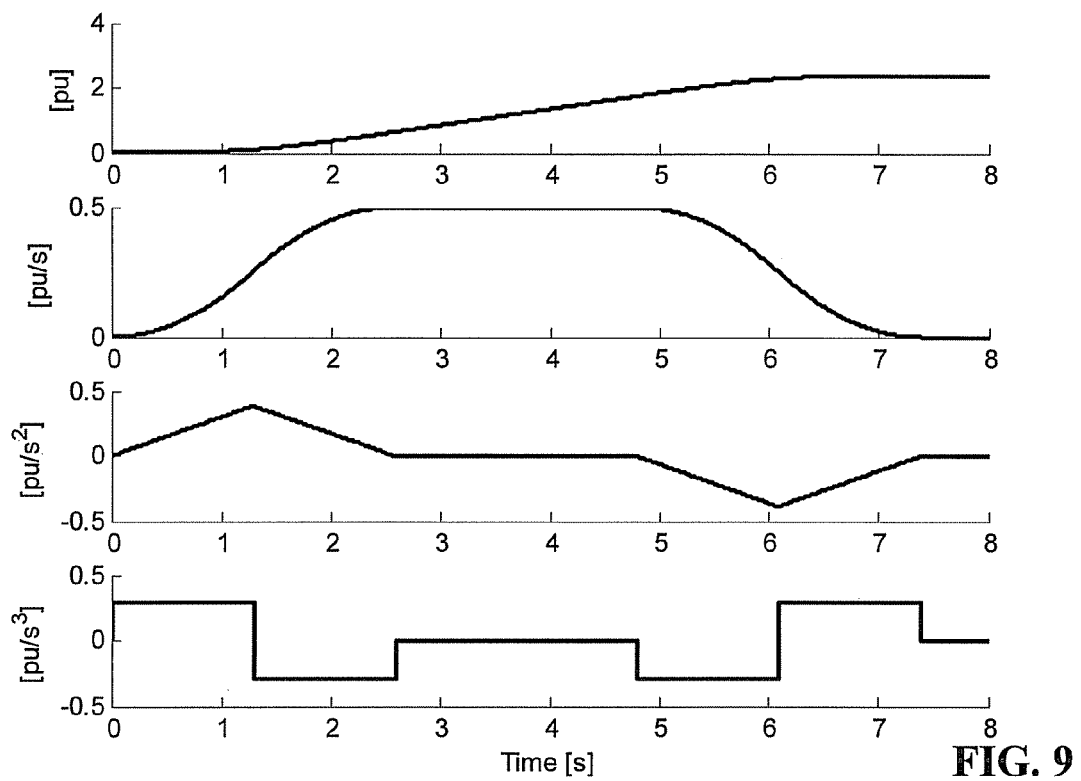
FIG. 9 illustrates an example S-curve profile that skips the constant acceleration and constant deceleration stages.
Figure 10:
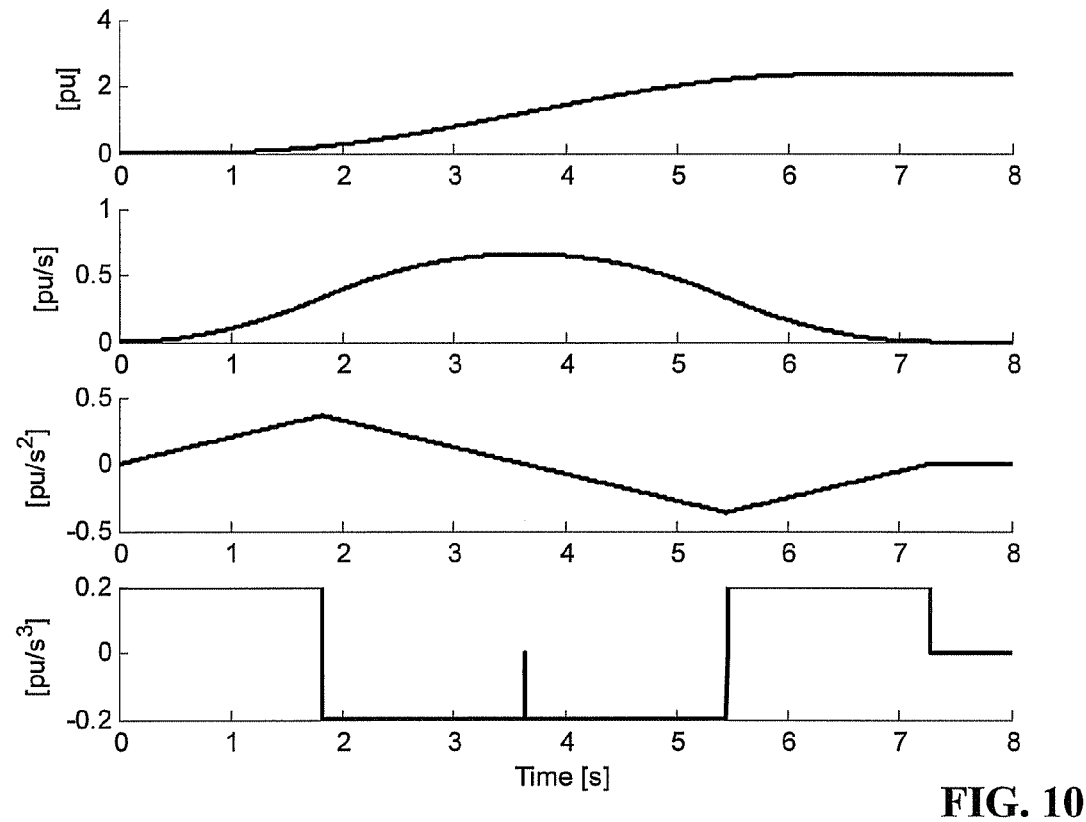
FIG. 10 illustrates an example S-curve profile that skips the constant acceleration, constant velocity, and constant deceleration stages.

FIGS. 7-10 illustrate segment skipping for exemplary seven-stage position profiles. FIG. 7 illustrates an exemplary S-curve profile that utilizes all seven stages. FIG. 8 illustrates a profile that skips segment 4 (the constant velocity stage). Profile generator may calculate such a profile in cases for which the position or velocity step to be traversed is small enough that the constant velocity stage will not be reached before the target position or velocity is reached. Upon receipt of such a position step or velocity setpoint command, the profile generator can make this determination prior to performing the profile calculations for the desired move, and will only perform calculations on stages 1-3 and 5-7. Similarly, FIG. 9 illustrates an example profile that skips segments 2 and 6, and FIG. 10 illustrates an example profile that skips segments 2, 4, and 6.

Figure 11:
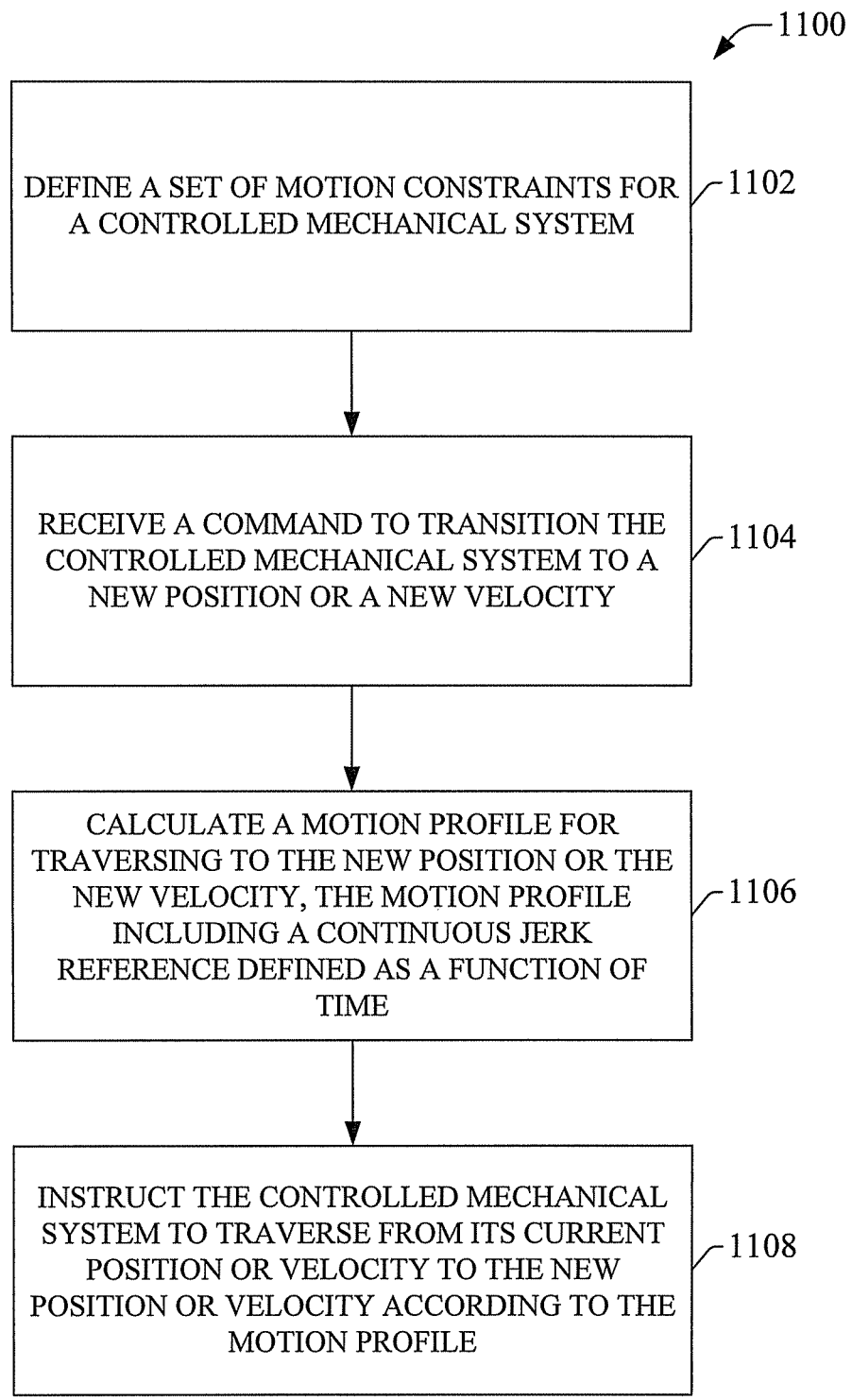
FIG. 11 is a flowchart of an example methodology for calculating a motion profile for a point-to-point move in a motion control system.
Figure 12:
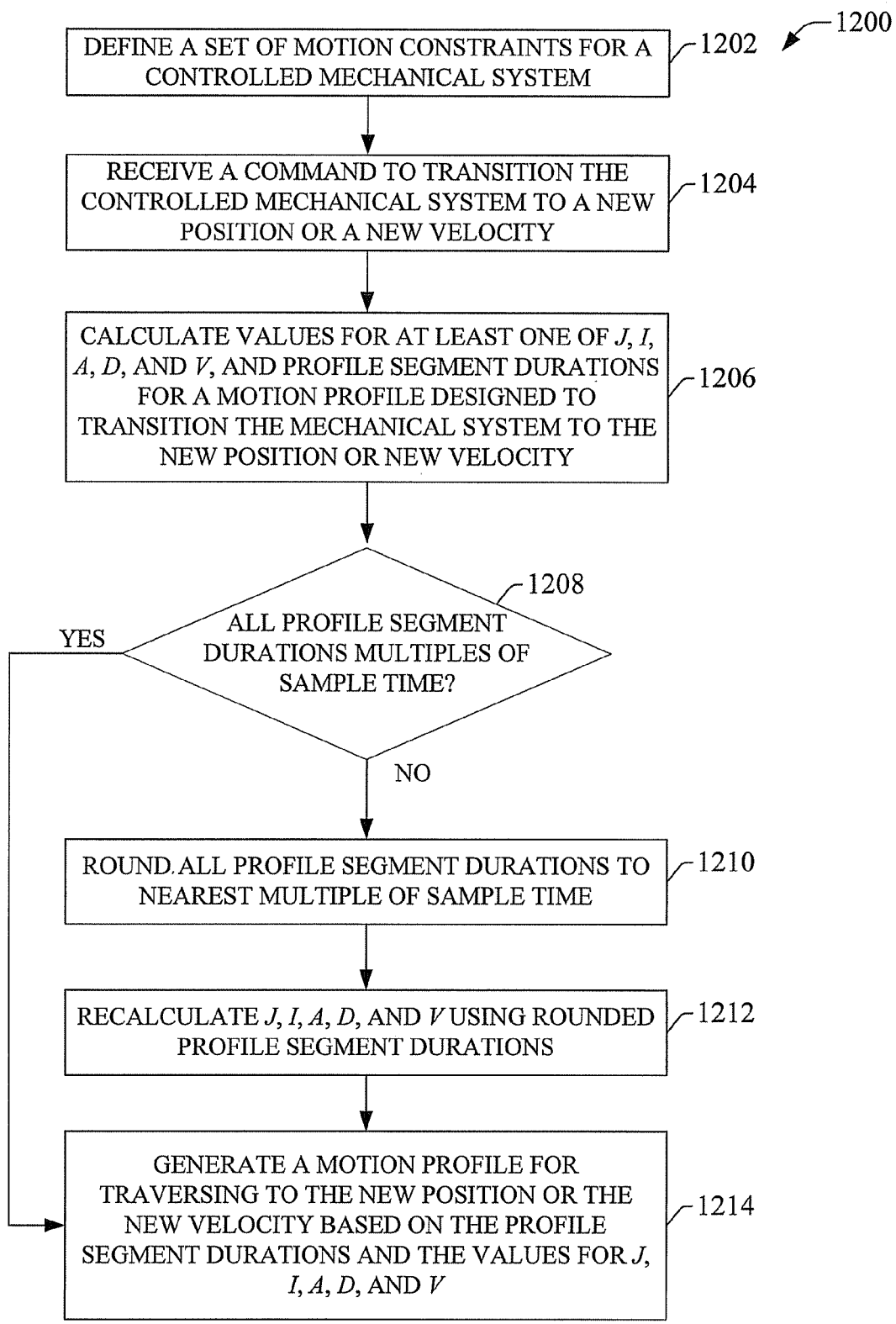
FIG. 12 is a flowchart of an example methodology for calculating a constraint-based time-optimal motion profile that conforms to a sample time of a motion controller.
Figure 13:
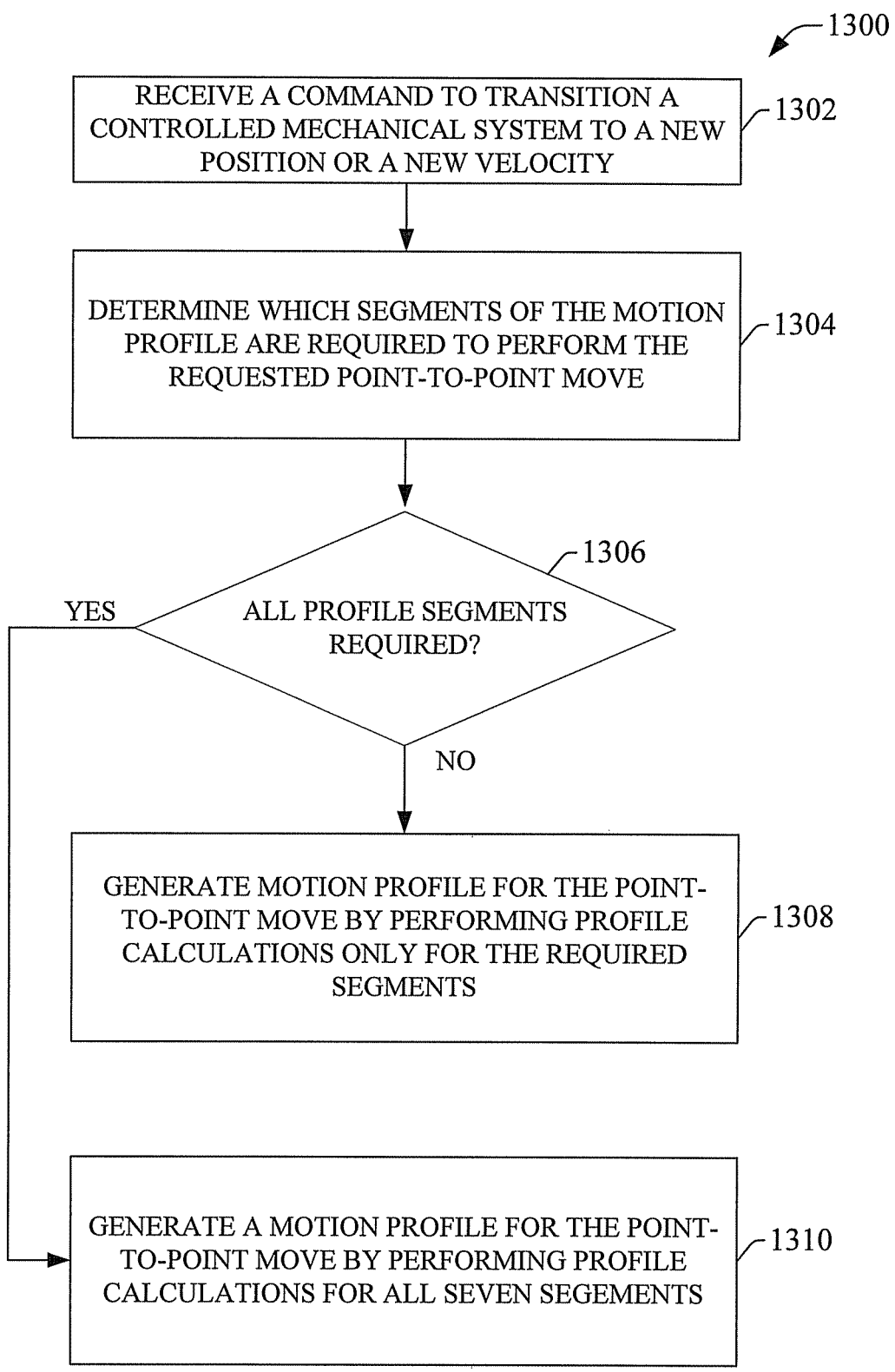
FIG. 13 is a flowchart of an example methodology for calculating a motion profile for a point-to-point move using segment skipping.

FIGS. 11-13 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 11 illustrates an example methodology 1100 for calculating a motion profile for a point-to-point move in a motion control system. At 1102, a set of motion constraints are defined for a motion control system. These constraints can represent physical constraints of a mechanical system controlled by the motion control system, and can include limits on velocity, acceleration, deceleration, and jerk. The constraints can also include a definition of the sample time for the motion controller used to control the mechanical system. At 1102, a command to transition the controlled mechanical system to a new position or velocity is received. This command can originate from a motion control program executed by the motion controller, or can be a manual move command entered by a user. The command can be received by a profile generator associated with the motion controller (e.g., profile generator 306, 402, or 502 described above).

At 1106, in response to receipt of the command received at step 1104, a motion profile can be calculated for moving the mechanical system from its current position or velocity to the new position or velocity indicated by the command. The profile generator can calculate this motion profile to include a continuous jerk reference defined as a function of time for at least one of the segments of the motion profile. In some embodiments, the motion profile can be calculated as an ST-curve according to the derivations described above in connection with equations (1)-(23). Such a motion profile can yield a jerk reference having the general format depicted by the dark solid line of the jerk graph illustrated in FIG. 6, in which the jerk gradually varies over time between a maximum and minimum value according to the calculated jerk function. At 1108, the controlled mechanical system is instructed to traverse from its current position or velocity to the new position or velocity according to the motion profile defined at step 1106. This can entail, for example, providing the motion profile calculated at step 1106 to a motor drive, which controls a motor that drives the mechanical system in accordance with the motion profile and (in the case of closed-loop control) a feedback signal providing measured real-time state data for the mechanical system.

FIG. 12 illustrates an example methodology 1200 for calculating a constraint-based time-optimal motion profile that conforms to a sample time of a motion controller. At 1202, a set of motion constrains for a controlled mechanical system are defined. As in previous examples, these can include limits on velocity, acceleration, deceleration, and jerk, as well as the sample time of the controller. These constraints can be provided to a profile generator associated with the controller (e.g., profile generator 306, 402, or 502 described above). At 1204, a command to transition the mechanical system from a current position or velocity to a new position or velocity is received (e.g., by the profile generator). At 1206, a motion profile for controlling the trajectory of the mechanical system in response to the command is generated by calculating at least one of the maximum acceleration jerk (J), maximum deceleration jerk (I), maximum acceleration (A), maximum deceleration (D), and maximum velocity (V) as functions of time for each segment of the motion profile (where the profile can comprise up to seven segments as defined in Table 1 above). In addition, the durations for each segment of the profile are calculated (for example, using the techniques described above in connection with equations (1)-(23)).

At 1208, it is determined whether all profile segment durations calculated at step 1206 are multiples of the sample time of the controller. If all segments have durations that are multiples of the sample time, the method moves to step 1214, where a motion profile is generated based on the profile segment durations and the values of J, I, A, D, and V calculated at step 1206. Alternatively, if one or more of the profile segments are not an even multiple of the cycle time, the method moves to step 1210, where all profile segment durations are upper-rounded to the nearest multiple of the sample time. At 1212, the values of one or more of J, I, A, D, and V are recalculated based on the rounded profile segment durations derived at step 1210. Based on the rounded profile segment durations and the recalculated values of J, I, A, D, and/or V, a motion profile is generated at 1214.

FIG. 13 illustrates an example methodology 1300 for efficiently calculating a motion profile for a point-to-point move using segment skipping. At 1302, a command to transition a controlled mechanical system to a new position or new velocity is received (e.g., at profile generator 306, 402, or 502). At 1304, a determination can be made regarding which of the seven segments of the motion profile are required to perform the requested point-to-point move. This determination can be made automatically by the profile generator based, for example, on a determination of the distance that must be traversed between the current position and the desired position (in the case of a position change) or the difference between the current velocity and the desired velocity (in the case of a velocity change).

At 1306, a determination is made as to whether all seven profile segments are required to carry out the desired move, based on the determination made at 1304. If all profile segments are required, the method moves to step 1310, where a motion profile is generated for the point-to-point move by performing profile calculations for all seven segments. Alternatively, if it is determined at step 1306 that one or more profile segments are not required, the method moves to step 1308, where a motion profile is generated for the point-to-point move by performing calculations only for the required segments, as determined at step 1304. Segment skipping according to methodology 1300 can facilitate more efficient calculation of a constraint-based, time-optimal motion profile by reducing unnecessary processing overhead associated with calculating unnecessary profile segments.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the motion profile generating system described herein can be implemented in any computer system or environment having any number of memory or storage units (e.g., memory 212 of FIG. 2), and any number of applications and processes occurring across any number of storage units. This includes, but is not limited to, an environment with server computers and client computers deployed in a network environment or a distributed computing environment, having remote or local storage. For example, with reference to FIG. 2, position profile generator 204, velocity profile generator 206, and interface component 208 can be stored on a single memory 212 associated with a single device, or can be distributed among multiple memories associated with respective multiple devices. Similarly, position profile generator 204, velocity profile generator 206, and interface component 208 can be executed by a single processor 210, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 14:
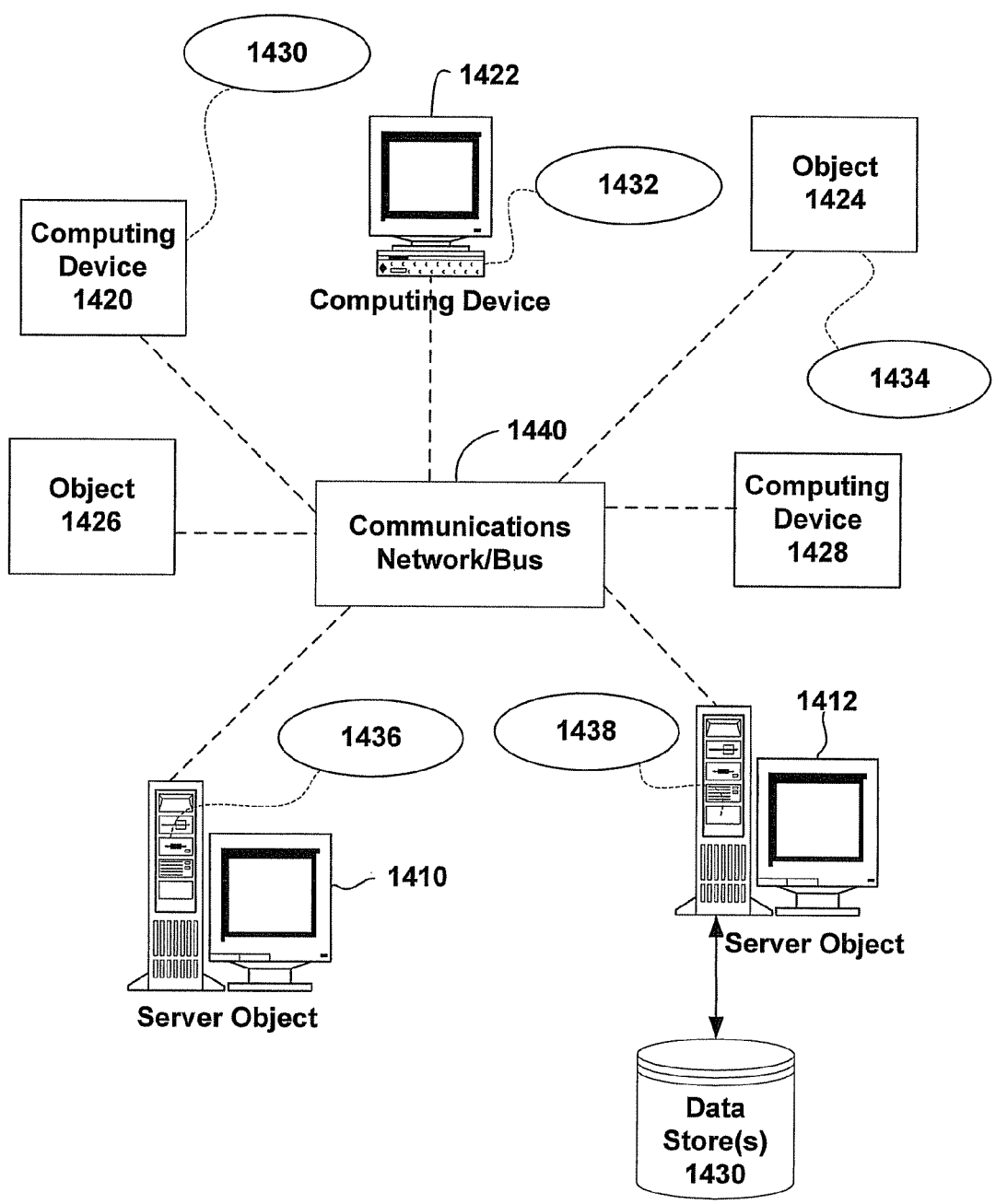
FIG. 14 is a block diagram representing an exemplary networked or distributed computing environment for implementing one or more embodiments described herein.

FIG. 14 provides a schematic diagram of an exemplary networked or distributed computing environment. The distributed computing environment includes computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects 1410, 1412, etc. and computing objects or devices 1420, 1422, 1424, 1426, 1428, etc. may comprise different devices, such as personal digital assistants (PDAs), audio/video devices, mobile phones, MP3 players, personal computers, laptops, tablets, etc., where embodiments of the profile generator described herein may reside on or interact with such devices.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1440, either directly or indirectly. Even though illustrated as a single element in FIG. 14, communications network 1440 may comprise other computing objects and computing devices that provide services to the system of FIG. 14, and/or may represent multiple interconnected networks, which are not shown. Each computing object 1410, 1412, etc. or computing, objects or devices 1420, 1422, 1424, 1426, 1428, etc. can also contain an application, such as applications 1430, 1432, 1434, 1436, 1438 (e.g., position profile generator 204, velocity profile generator 206, or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc. provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1440 is the Internet, for example, the computing objects 1410, 1412, etc. can be Web servers, file servers, media servers, etc. with which the client computing objects or devices 1420, 1422, 1424, 1426, 1428, etc. communicate via any of a number of known protocols, such as the hypertext transfer protocol (HTTP). Computing objects 1410, 1412, etc. may also serve as client computing objects or devices 1420, 1422, 1424, 1426, 1428, etc., as may be characteristic of a distributed computing environment.

Exemplary Computing Device

Figure 15:
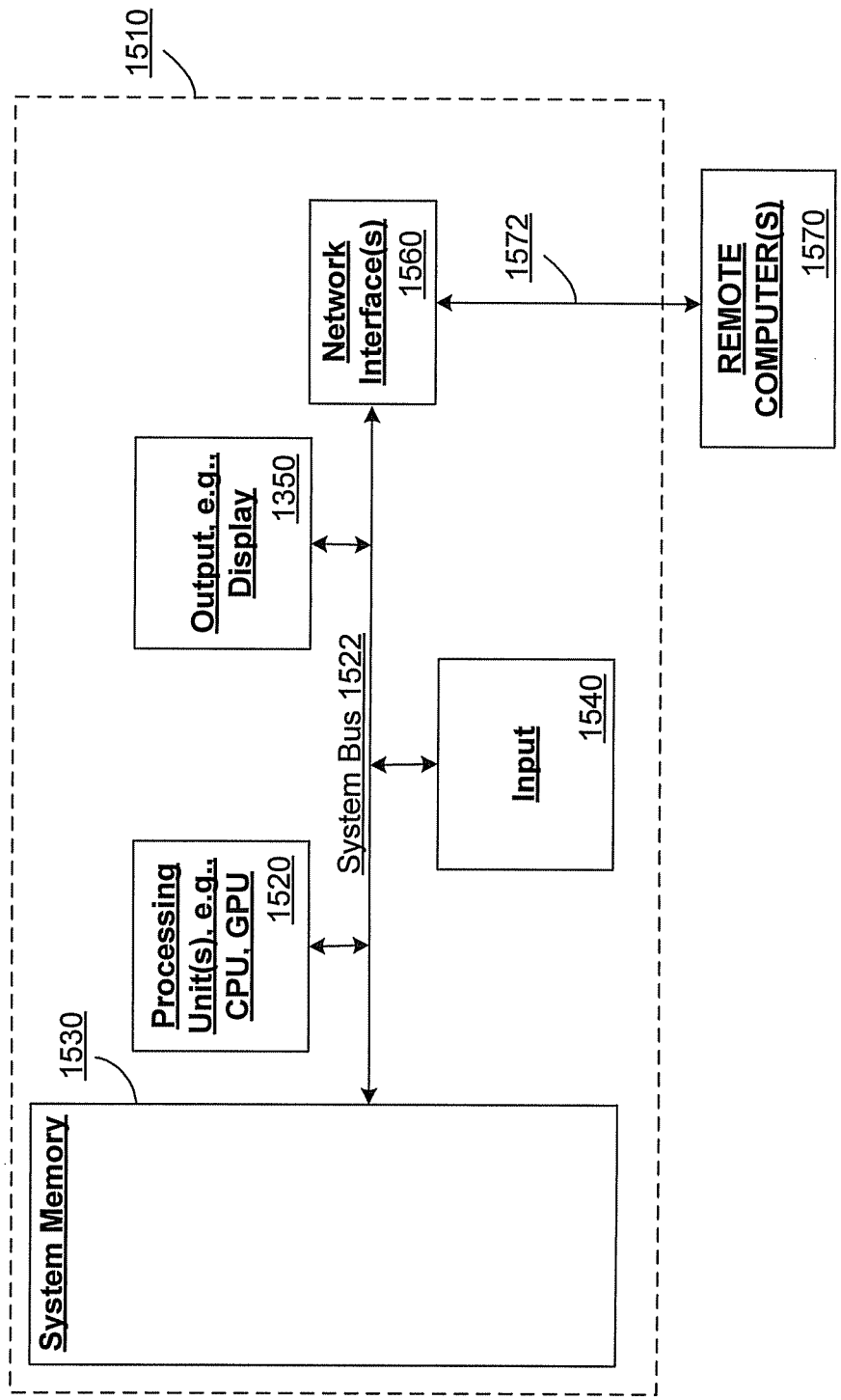
FIG. 15 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 15 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 15 thus illustrates an example of a suitable computing system environment 1500 in which one or aspects of the embodiments described herein can be implemented, although as made clear above, the computing system environment 1500 is only one example of a suitable computing environment and is not intended to suggest any limitation as to scope of use or functionality. Neither is the computing system environment 1500 be interpreted as having any dependency or requirement relating to any one or combination of components illustrated in the exemplary computing system environment 1500.

With reference to FIG. 15, an exemplary computing device for implementing one or more embodiments in the form of a computer 1510 is depicted. Components of computer 1510 may include, but are not limited to, a processing unit 1520, a system memory 1530, and a system bus 1522 that couples various system components including the system memory to the processing unit 1520. Processing unit 1520 may, for example, perform functions associated with processor(s) 210 of motion profile generating system 202, while system memory 1530 may perform functions associated with memory 212.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, system memory 1530 may also include an operating system, application programs, other program modules, and program data.

A user can enter commands and information into the computer 1510 through input devices 1540, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1510. A monitor or other type of display device is also connected to the system bus 1522 via an interface, such as output interface 1550. In addition to a monitor, computers can also include other peripheral output devices such as speakers and a printer, which may be connected through output interface 1550. In one or more embodiments, input devices 1540 can provide user input to interface component 208, while output interface 1550 can receive information relating to operations of motion profile generating system 202 from interface component 208.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 212) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g., inferring which profile segments may be skipped), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 11-13). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method for generating a motion profile, comprising:
receiving, by a system comprising at least one processor, a setpoint indicating at least one of a target position or a target velocity for a motion device; and
generating, by the system, a motion profile for transitioning the motion device to the at least one of the target position or the target velocity, the motion profile defining a jerk reference that varies continuously as a function of time within a segment of the motion profile, wherein the generating comprises:
calculating time durations for respective segments of the motion profile;
rounding the time durations to respective nearest multiples of a sample time of a motion controller to yield rounded time durations; and
recalculating the jerk reference using the rounded time durations.

2. The method of claim 1, wherein the generating the motion profile comprises defining, as a function of time, at least one of an acceleration reference, a velocity reference, or a position reference for the at least one segment of the motion profile.

3. The method of claim 2, further comprising calculating at least one of the jerk reference, the acceleration reference, the velocity reference, or the position reference for the segment of the motion profile based on at least one of the sample time, a velocity limit parameter, an acceleration limit parameter, a jerk limit parameter, or a deceleration limit parameter.

4. The method of claim 2, wherein the generating the motion profile comprises defining the acceleration reference for a first segment of the motion profile to have a different absolute value than the deceleration reference for a second segment of the motion profile.

5. The method of claim 1, wherein the generating the motion profile further comprises:
determining, based at least on a current state of the motion device and a target state of the motion device indicated by the setpoint, which segments of the motion profile are required segments for transitioning the motion device to the at least one of the target position or the target velocity; and
calculating respective position references, velocity references, acceleration references, and jerk references for the required segments, including omitting position reference, velocity reference, acceleration reference, and jerk reference calculations for segments that are not required segments.

6. The method of claim 5, wherein the determining comprises inferring which segments of the motion profile are required based at least in part on historical motion data.

7. The method of claim 1, wherein the generating comprises generating the motion profile according to relationships represented by:

$$t_1^3(t_1+t_2) = t_4^3(t_4+t_5),$$

$$t_1 = \frac{3A}{2J},$$

$$t_4 = \frac{3D}{2I},$$

$$t_2 = \frac{V}{A} - \frac{3A}{2J},$$

$$t_5 = \frac{V}{D} - \frac{3D}{2I},$$

$$t_3 = \frac{P}{V} - \frac{3A}{4J} - \frac{V}{2A} - \frac{3D}{4I} - \frac{V}{2D},$$

$$\frac{A^2}{D^2} = \frac{J^3}{I^3},$$

$$V \geq \frac{3A^2}{2J} = \frac{3}{2I\rho^{\frac{4}{3}}}D^2,$$

$$V \geq \frac{3}{2I}D^2,$$

$$\frac{P}{V} \geq \frac{3}{4I}\rho^{-\frac{1}{3}}D + \frac{\rho}{2}\frac{V}{D} + \frac{3}{4I}D + \frac{1}{2}\frac{V}{D},$$

$$\frac{P}{V} \geq \left(\rho^{-\frac{1}{3}} + 1\right)\frac{3}{4I}D + \frac{1}{2}(\rho+1)\frac{V}{D}, \text{ and}$$

$$\frac{I}{J} = \rho^{\frac{2}{3}}$$

where:
P is a position of the motion device,
J is a maximum acceleration jerk,
I is a maximum deceleration jerk,
A is a maximum acceleration,
D is a maximum deceleration,
V is a maximum velocity,
$t_1$ is a duration of an increasing acceleration stage and a decreasing acceleration stage of the motion profile,
$t_2$ is a duration of a constant acceleration stage of the motion profile,
$t_3$ is a duration of a constant velocity stage of the motion profile,
$t_4$ is a duration of an increasing deceleration stage and a decreasing deceleration stage of the motion profile,
$t_5$ is a duration of a constant deceleration stage of the motion profile, and $$\rho = \frac{D}{A}.$$

8. A system for generating a motion profile, comprising:
a memory; and
a processor configured to execute computer-executable components stored on the memory, the computer-executable components comprising:
a motion profile generator configured to generate, in response to receipt of a target position or a target velocity for a motion device, a motion profile defining a continuous jerk reference that varies continuously within a stage of the motion profile, wherein the motion profile defines a trajectory for transitioning the motion device to the target position or the target velocity,
wherein the motion profile generator is further configured to calculate time durations for respective stages of the motion profile, round the time durations to respective nearest multiples of a sample time of a motion controller to yield rounded time durations, and recalculate the jerk reference based on the rounded time durations.

9. The system of claim 8, wherein the motion profile generator is further configured to generate the motion profile as a function of at least one defined constraint, wherein the at least one defined constraint includes at least one of the sample time, a velocity limit, an acceleration limit, a jerk limit, or a deceleration limit.

10. The system of claim 9, further comprising an interface component configured to receive input specifying the at least one defined constraint.

11. The system of claim 8, wherein the motion profile generator is further configured to generate the motion profile based on a maximum acceleration and a maximum deceleration, wherein an absolute value of the maximum acceleration is different than an absolute value of the maximum deceleration.

12. The system of claim 8, wherein the motion profile generator is further configured to determine, in response to receipt of the target position or the target velocity, which stages of the motion profile are required to transition the motion device to the target position or the target velocity based at least in part on a current state of the motion device and the target position or the target velocity.

13. The system of claim 12, further comprising a storage component configured to store historical data comprising previously received move commands and corresponding trajectory data for the motion device, wherein the motion profile generator is further configured to infer which stages of the motion profile are required to transition the motion device to the target position or the target velocity based at least in part on an analysis of the historical data.

14. The system of claim 8, wherein the motion profile generator is further configured to generate the motion profile according to relationships represented by:

$$t_1^3(t_1 + t_2) = t_4^3(t_4 + t_5),$$

$$t_1 = \frac{3A}{2J},$$

$$t_4 = \frac{3D}{2I},$$

$$t_2 = \frac{V}{A} - \frac{3A}{2J},$$

$$t_5 = \frac{V}{D} - \frac{3D}{2I},$$

$$t_3 = \frac{P}{V} - \frac{3A}{4J} - \frac{V}{2A} - \frac{3D}{4I} - \frac{V}{2D},$$

$$\frac{A^2}{D^2} = \frac{J^3}{I^3},$$

$$V \geq \frac{3A^2}{2J} = \frac{3}{2I\rho^{\frac{4}{3}}}D^2,$$

$$V \geq \frac{3}{2I}D^2,$$

$$\frac{P}{V} \geq \frac{3}{4I}\rho^{-\frac{1}{3}}D + \frac{\rho}{2}\frac{V}{D} + \frac{3}{4I}D + \frac{1}{2}\frac{V}{D},$$

$$\frac{P}{V} \geq \left(\rho^{-\frac{1}{3}} + 1\right)\frac{3}{4I}D + \frac{1}{2}(\rho + 1)\frac{V}{D}, \text{ and}$$

$$\frac{I}{J} = \rho^{\frac{2}{3}}$$

where:
P is a position of the motion device,
J is a maximum acceleration jerk,
I is a maximum deceleration jerk,
A is a maximum acceleration,
D is a maximum deceleration,
V is a maximum velocity,
$t_1$ is a duration of an increasing acceleration stage and a decreasing acceleration stage of the motion profile,
$t_2$ is a duration of a constant acceleration stage of the motion profile,
$t_3$ is a duration of a constant velocity stage of the motion profile,
$t_4$ is a duration of an increasing deceleration stage and a decreasing deceleration stage of the motion profile,
$t_5$ is a duration of a constant deceleration stage of the motion profile, and $$\rho = \frac{D}{A}.$$

15. A non-transitory computer-readable medium having stored thereon computer-executable instructions that, in response to execution, cause a computer system to perform operations, comprising:
receiving a move command specifying at least one of a new position or a new velocity for a motion device; and
generating a motion profile for transitioning the motion device to the at least one of the target position or the target velocity, the motion profile defining a jerk reference that varies continuously as a function of time within a segment of the motion profile,
wherein the generating comprises:
determining time durations for respective segments of the motion profile;
rounding the time durations to respective nearest multiples of a defined sample time resulting in rounded time durations; and
re-determining the jerk reference using the rounded time durations.

16. The non-transitory computer-readable medium of claim 15, wherein the generating comprises:
determining, based at least on a current state of the motion device and the at least one of the new position or the new velocity indicated by the move command, which segments of the motion profile are required segments for transitioning the motion device to the at least one of the new position or the new velocity;
calculating respective position references, velocity references, acceleration references, and jerk references for the required segments, and
omitting position reference, velocity reference, acceleration reference, and jerk reference calculations for segments that are not required segments.

17. The non-transitory computer-readable medium of claim 15, wherein the generating comprises generating the motion profile according to relationships comprising:

$$t_1^3(t_1 + t_2) = t_4^3(t_4 + t_5),$$

$$t_1 = \frac{3A}{2J},$$

$$t_4 = \frac{3D}{2I},$$

-continued $$t_2 = \frac{V}{A} - \frac{3A}{2J},$$

$$t_5 = \frac{V}{D} - \frac{3D}{2I},$$

$$t_3 = \frac{P}{V} - \frac{3A}{4J} - \frac{V}{2A} - \frac{3D}{4I} - \frac{V}{2D},$$

$$\frac{A^2}{D^2} = \frac{J^3}{I^3},$$

$$V \geq \frac{3A^2}{2J} = \frac{3}{2I\rho^{\frac{4}{3}}}D^2,$$

$$V \geq \frac{3}{2I}D^2,$$

$$\frac{P}{V} \geq \frac{3}{4I}\rho^{-\frac{1}{3}}D + \frac{\rho}{2}\frac{V}{D} + \frac{3}{4I}D + \frac{1}{2}\frac{V}{D},$$

$$\frac{P}{V} \geq \left(\rho^{-\frac{1}{3}} + 1\right)\frac{3}{4I}D + \frac{1}{2}(\rho+1)\frac{V}{D}, \text{ and}$$

$$\frac{I}{J} = \rho^{\frac{2}{3}}$$

where:
  P is a position of the motion device,
  J is a maximum acceleration jerk,
  I is a maximum deceleration jerk.
  A is a maximum acceleration.
  D is a maximum deceleration.
  V is a maximum velocity,
  $t_1$ is a duration of an increasing acceleration stage and a decreasing acceleration stage of the motion profile,
  $t_2$ is a duration of a constant acceleration stage of the motion profile,
  $t_3$ is a duration of a constant velocity stage of the motion profile,
  $t_4$ is a duration of an increasing deceleration stage and a decreasing deceleration stage of the motion profile,
  $t_5$ is a duration of a constant deceleration stage of the motion profile, and $$\rho = \frac{D}{A}.$$

18. The non-transitory computer-readable medium of claim 15, wherein the generating the motion profile further comprises determining least one of the jerk reference, an acceleration reference, a velocity reference, or a position reference for the segment of the motion profile based on at least one of the defined sample time, a velocity limit parameter, an acceleration limit parameter, a jerk limit parameter, or a deceleration limit parameter.

19. The non-transitory computer-readable medium of claim 15, wherein the generating the motion profile further comprises defining an acceleration reference for a first segment of the motion profile to have a different absolute value than a deceleration reference for a second segment of the motion profile.

20. The non-transitory computer-readable medium of claim 15, wherein the generating the motion profile further comprises:
  determining, based at least on a current state of the motion device and a target state of the motion device indicated by the new position or the new velocity, which segments of the motion profile are required segments for transitioning the motion device to the at least one of the new position or new target velocity; and
  calculating respective position references, velocity references, acceleration references, and jerk references for the required segments, including omitting position reference, velocity reference, acceleration reference, and jerk reference calculations for segments that are not required segments.

* * * * *